(12) United States Patent
Eberlein

(10) Patent No.: US 11,123,836 B2
(45) Date of Patent: Sep. 21, 2021

(54) DRIVER SHAFT SUPPORT ASSEMBLIES, SETUP ASSEMBLIES, AND CUTTING ASSEMBLIES

(71) Applicant: Marc Eberlein, Post Falls, ID (US)

(72) Inventor: Marc Eberlein, Post Falls, ID (US)

( * ) Notice: Subject to any disclaimer, the term of this patent is extended or adjusted under 35 U.S.C. 154(b) by 682 days.

(21) Appl. No.: 15/877,325

(22) Filed: Jan. 22, 2018

(65) Prior Publication Data

US 2018/0264615 A1 Sep. 20, 2018

Related U.S. Application Data

(60) Provisional application No. 62/471,814, filed on Mar. 15, 2017.

(51) Int. Cl.
| | |
|---|---|
| *B24B 3/26* | (2006.01) |
| *B24B 3/60* | (2006.01) |
| *B24B 21/04* | (2006.01) |
| *B25B 15/00* | (2006.01) |
| *B23B 31/12* | (2006.01) |
| *B24B 41/06* | (2012.01) |

(52) U.S. Cl.
CPC .............. *B24B 3/26* (2013.01); *B24B 3/60* (2013.01); *B24B 21/04* (2013.01); *B25B 15/004* (2013.01); *B23B 31/1253* (2013.01); *B24B 41/066* (2013.01)

(58) Field of Classification Search
CPC .. B24B 3/26; B24B 3/60; B24B 21/04; B24B 41/066; B24B 3/38; B24B 23/024; B24B 19/00; B25B 15/004; B23B 31/1253; B23Q 16/00

USPC ........ 219/490; 451/364, 231, 194, 196, 198, 451/294
See application file for complete search history.

(56) References Cited

U.S. PATENT DOCUMENTS

| | | |
|---|---|---|
| 535,021 A | 3/1895 | Rivett |
| 2,249,084 A | 7/1941 | Kobos |
| 2,592,000 A | 4/1952 | Barrett |
| 2,593,847 A | 4/1952 | Clark |
| 2,595,950 A | 5/1952 | Keebler |
| 2,653,421 A | 9/1953 | Kobos |
| 2,689,739 A | 9/1954 | May |
| 2,733,559 A | 2/1956 | Staudt, Sr. |
| 4,001,975 A | 1/1977 | Bernard et al. |

(Continued)

FOREIGN PATENT DOCUMENTS

| | | |
|---|---|---|
| CN | 202861437 | 4/2013 |
| CN | 103551933 | 2/2014 |

(Continued)

OTHER PUBLICATIONS

GB GB1802736.7 Search Report, dated Aug. 7, 2016, Eberlein.
Hughes, Steven Dodd, "Gunsmithing Screwdrivers For Double Guns", finegunmaking.com, 2010, United States, 7 pages.

*Primary Examiner* — Vishal Pancholi
*Assistant Examiner* — Robert K Nichols, II
(74) *Attorney, Agent, or Firm* — Wells St. John P.S.

(57) ABSTRACT

Driver support assemblies to work in concert with a setup assembly are provided. Setup assemblies to work in concert with a driver support assembly and a cutting assembly are provided. Cutting assemblies configured to work in concert with a driver support assembly are provided. Driver tip cutting assemblies are provided. Methods for cutting the tip of a driver shaft are provided.

12 Claims, 35 Drawing Sheets

(56) References Cited

U.S. PATENT DOCUMENTS

| | | | |
|---|---|---|---|
| 4,069,619 | A | 1/1978 | Escamilla |
| 4,093,247 | A | 6/1978 | Bernard et al. |
| 4,338,749 | A | 7/1982 | Kiser |
| 4,716,797 | A | 1/1988 | Colvin |
| 5,301,473 | A * | 4/1994 | Seear ................. B24B 3/36 451/266 |
| 5,400,546 | A | 3/1995 | Christian et al. |
| 5,461,944 | A | 10/1995 | Ciumaga |
| 5,735,732 | A | 4/1998 | Bernard |
| 5,816,898 | A | 10/1998 | Wirth, Jr. et al. |
| 6,626,745 | B1 | 9/2003 | Bernard |
| 6,640,679 | B1 | 11/2003 | Roberts, Jr. |
| 6,652,367 | B1 * | 11/2003 | Lin ..................... B24B 3/24 451/178 |
| 6,676,494 | B1 * | 1/2004 | Ching ................. B24B 3/247 451/231 |
| 7,473,163 | B1 * | 1/2009 | Lee ..................... B24B 3/02 451/231 |
| 2016/0318107 | A1 | 11/2016 | Mauch |

FOREIGN PATENT DOCUMENTS

| | | |
|---|---|---|
| DE | 20120048 | 9/2002 |
| KR | 20120027863 | 3/2012 |
| WO | WO2013/046147 | 4/2013 |

* cited by examiner

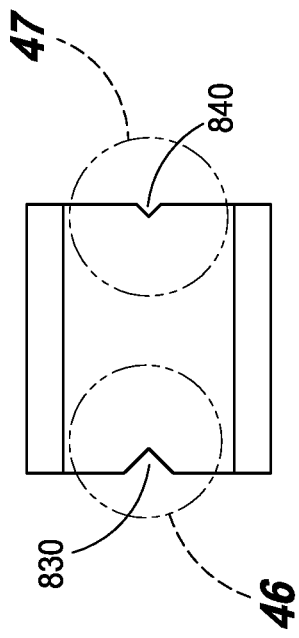
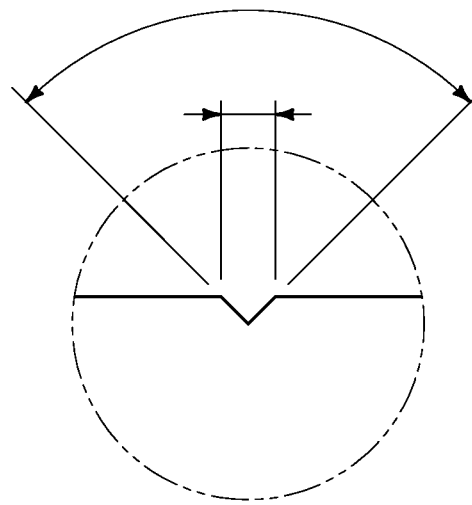
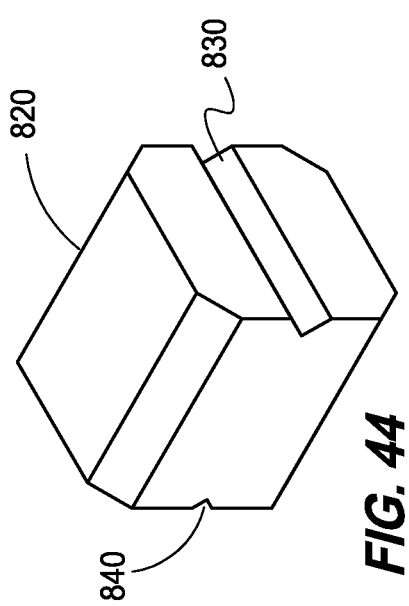
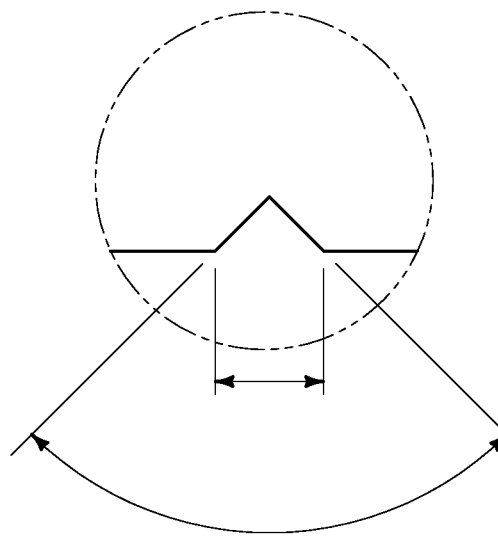

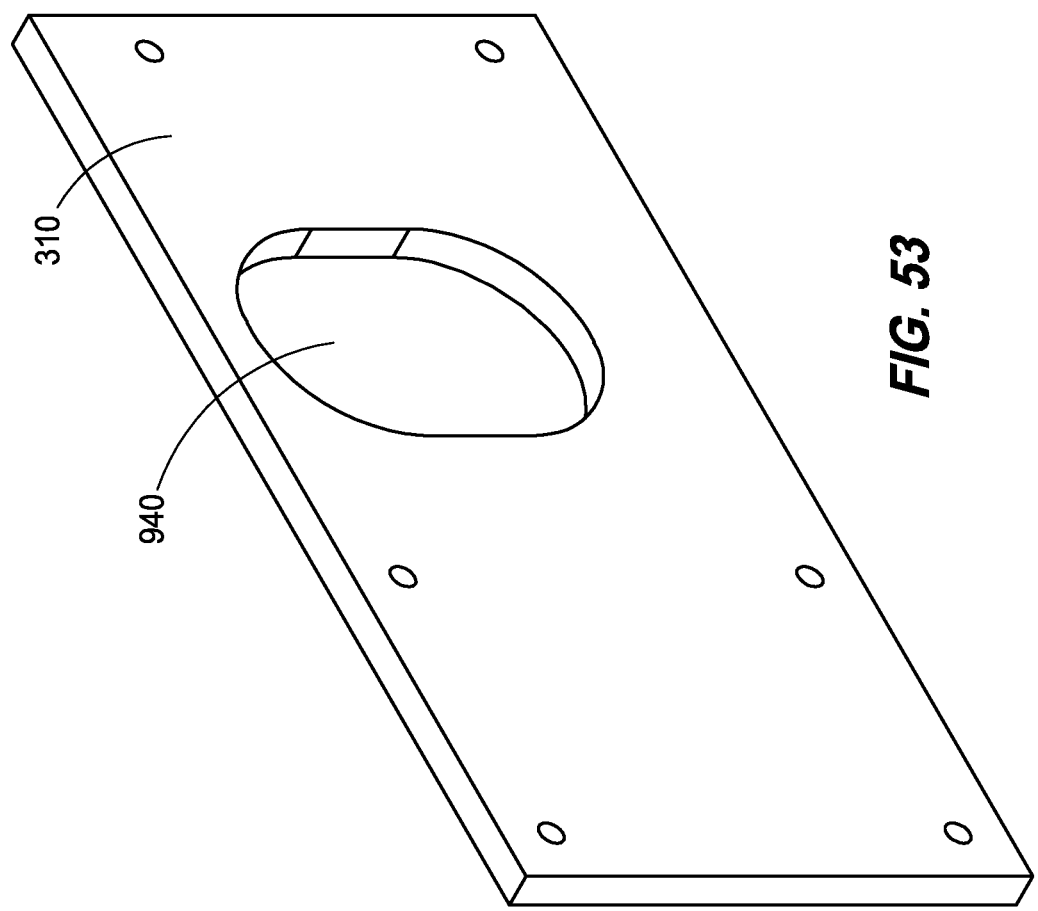

DRIVER SHAFT SUPPORT ASSEMBLIES, SETUP ASSEMBLIES, AND CUTTING ASSEMBLIES

CROSS REFERENCE TO RELATED APPLICATION

This application claims priority to U.S. Provisional Patent Application Ser. No. 62/471,814 filed Mar. 15, 2017, entitled "Driver Shaft Jig Assemblies, Setup Assemblies, and Cutting Assemblies", the entirety of which is incorporated by reference herein.

TECHNICAL FIELD

The present disclosure relates to driver shaft support assemblies, driver shaft setup assemblies, and driver shaft cutting assemblies. Specific implementations of the present disclosure provide embodiments that can include screwdriver shaft support assemblies, setup, and cutting assemblies as well as an overall assembly that utilizes these three assemblies to prepare a customized driver shaft tip and/or clean up a damaged tip.

BACKGROUND

As craftsmen work with mechanical devices such as those devices which are utilized and/or manipulated in the practice of removing threaded fasteners, various dimensionally correct shaft driver tips are required. Precisely shaped and dimensioned shaft driver tips may have been utilized by the original craftsmen that designed these original mechanical devices, but however are no longer workable and/or are no longer available from commercial providers.

For example, in gunsmithing, it may be necessary to remove a screw in an effort to disassemble the gun for servicing without damaging the screw and to replace the screw without damage when reassembling the gun. It may be that commercially available screwdrivers will not sufficiently remove the screw, as they are shaped improperly or have the improper dimensions to remove the screw without damaging the screw head itself, which may diminish the functionality, originality and/or artistic value.

The present disclosure provides assemblies that can be utilized to prepare and shape custom driver shaft tips that can be utilized to precisely fit screw heads and manipulate those screw heads without damaging the screw head itself.

SUMMARY

Driver support assemblies to work in concert with a setup assembly are provided. The driver support assemblies can include: a body defining a hollow chamber configured to receive a shaft therethrough; a collet configured to receive the shaft and operatively engage the body to secure the shaft in relation to the body; and at least one fixed construct in fixed relation to the body, the construct configured to align the support assembly with a setup assembly.

Setup assemblies to work in concert with a driver support assembly and a cutting assembly are provided. The setup assembly can include: a setup cradle configured to receive a body of a driver support assembly; and at least one opening defined by the setup cradle, the opening configured to receive a constructs of the driver support assembly.

Cutting assemblies configured to work in concert with a driver support assembly are provided. The cutting assemblies can include: a cutting cradle configured to slidably engage a body of a driver support assembly; at least one opening defined by the cutting cradle, the opening configured to receive constructs of the driver support assembly; and a cutting tool extending normally to the cutting cradle.

Driver tip cutting assemblies are provided that can include a platform supporting a set up assembly and a cutting assembly.

Methods for cutting the tip of a driver shaft are provided. The methods can include: operatively affixing a driver shaft within a driver support assembly to affix the alignment of the tip of the shaft in relation to constructs of the driver support assembly; and engaging the constructs of the driver support assembly with a cutting cradle of a cutting assembly to remove specific portions of the shaft and create or refurbish a tip of the shaft.

DRAWINGS

Embodiments of the disclosure are described below with reference to the following accompanying drawings.

Figure 14:
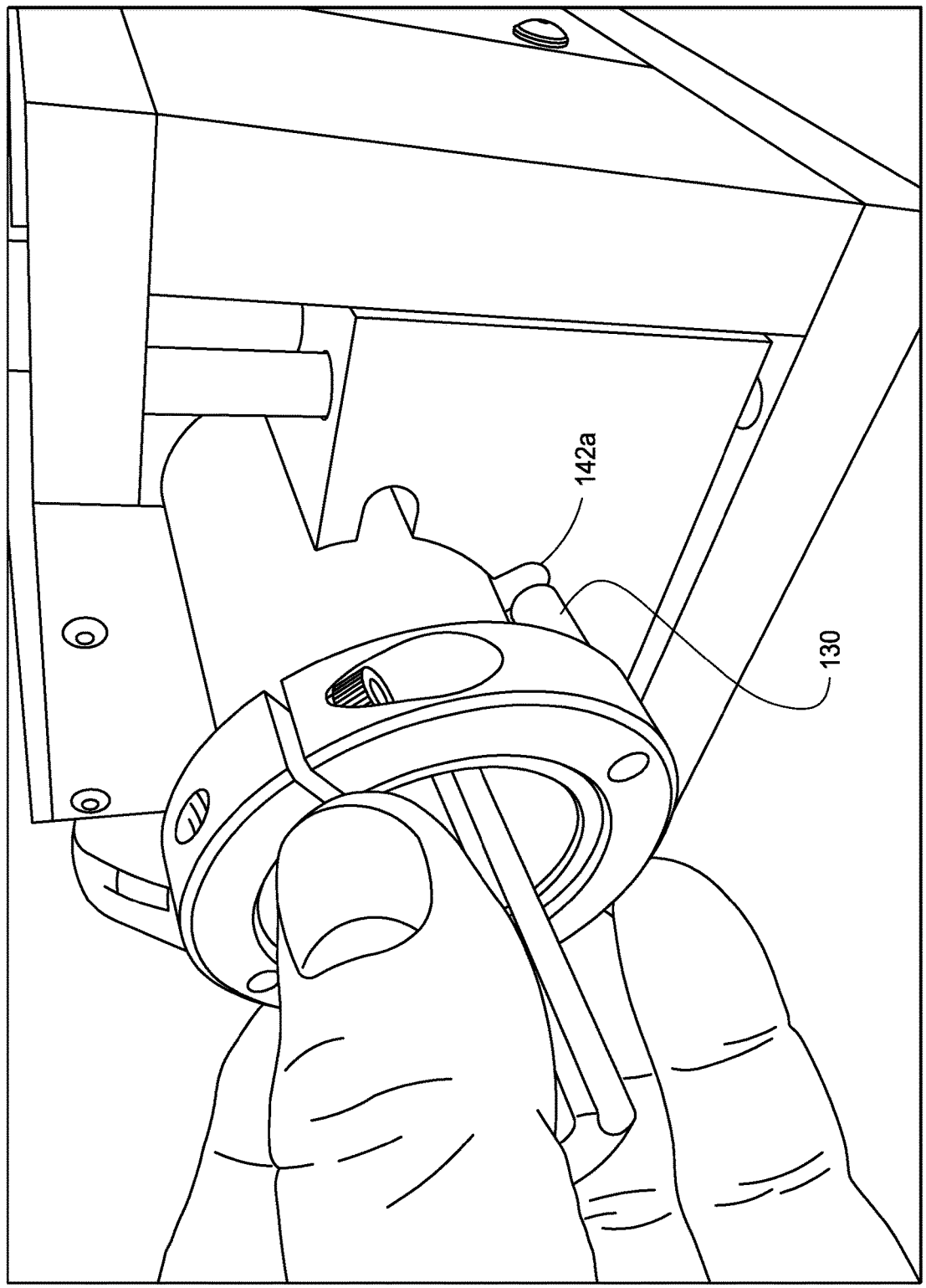

FIG. 14. Is a depiction of a driver support assembly engaging a cutting assembly in an alternative engagement according to an embodiment of the disclosure.

Figure 15:
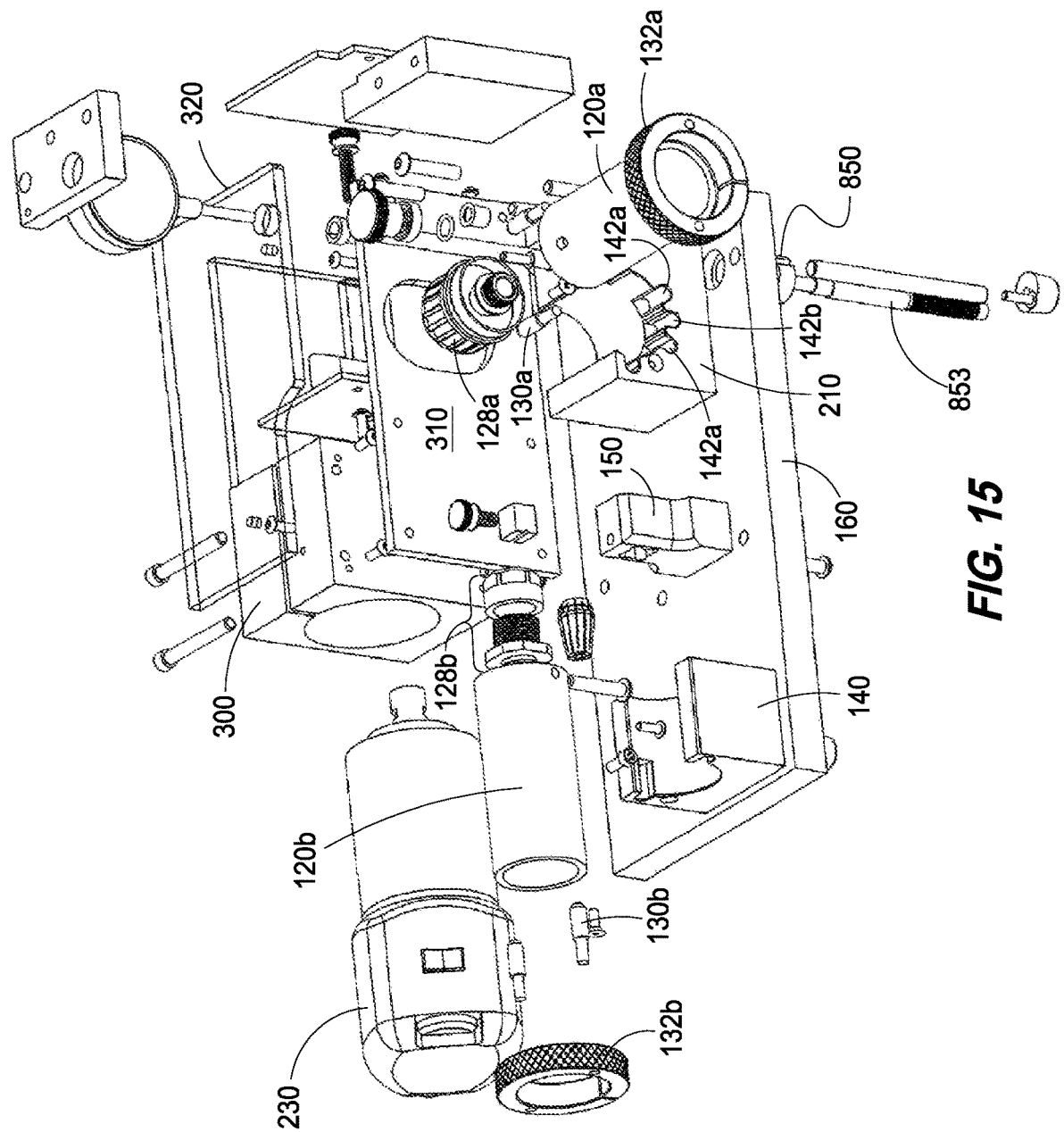

FIG. 15 is an exploded view of a cutting assembly and kit according to an embodiment of the disclosure.

Figure 16:
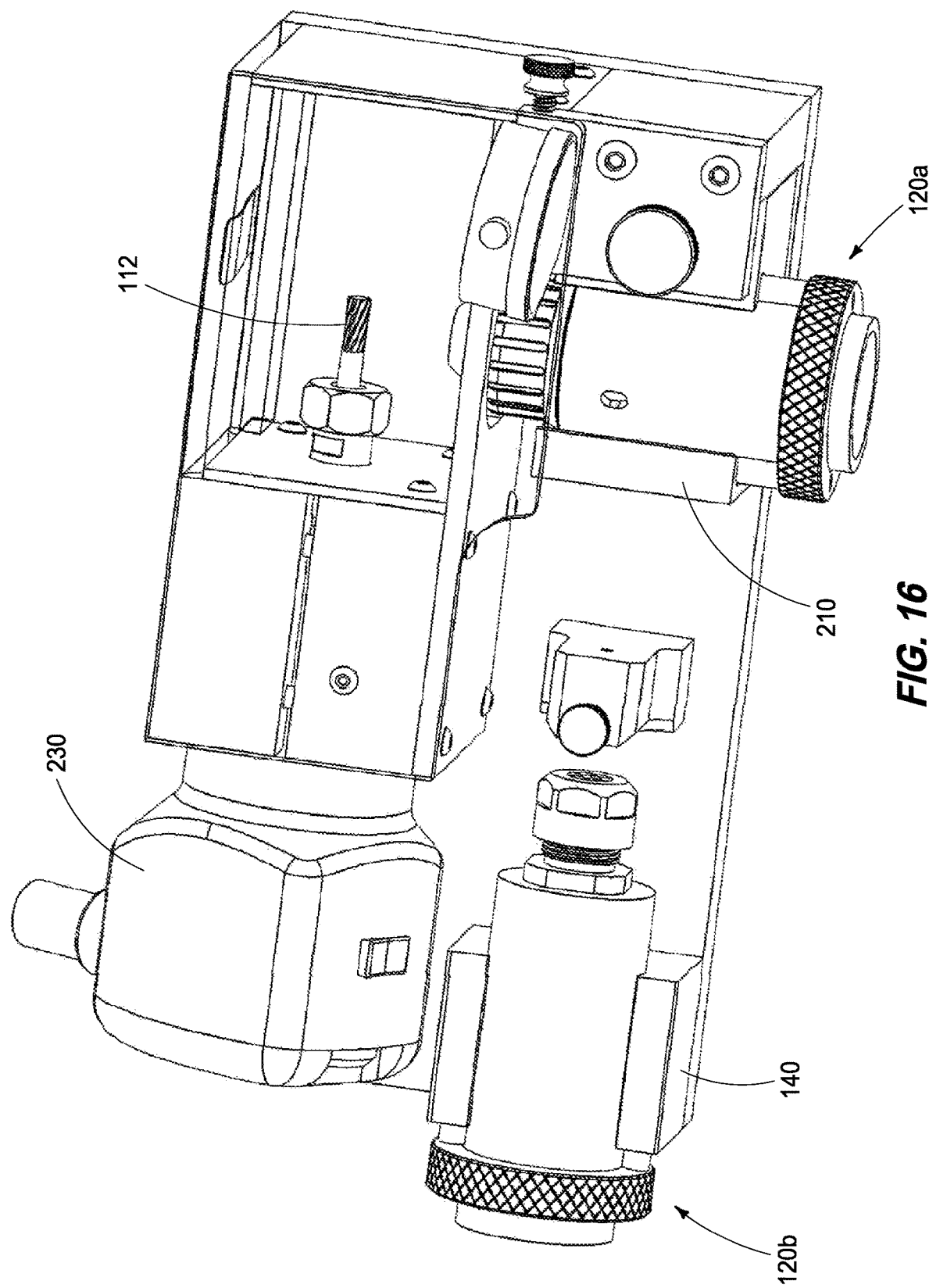

FIG. 16 is another view of a cutting assembly, setup assembly, and driver support assemblies engaged therein according to an embodiment of the disclosure.

Figure 17:
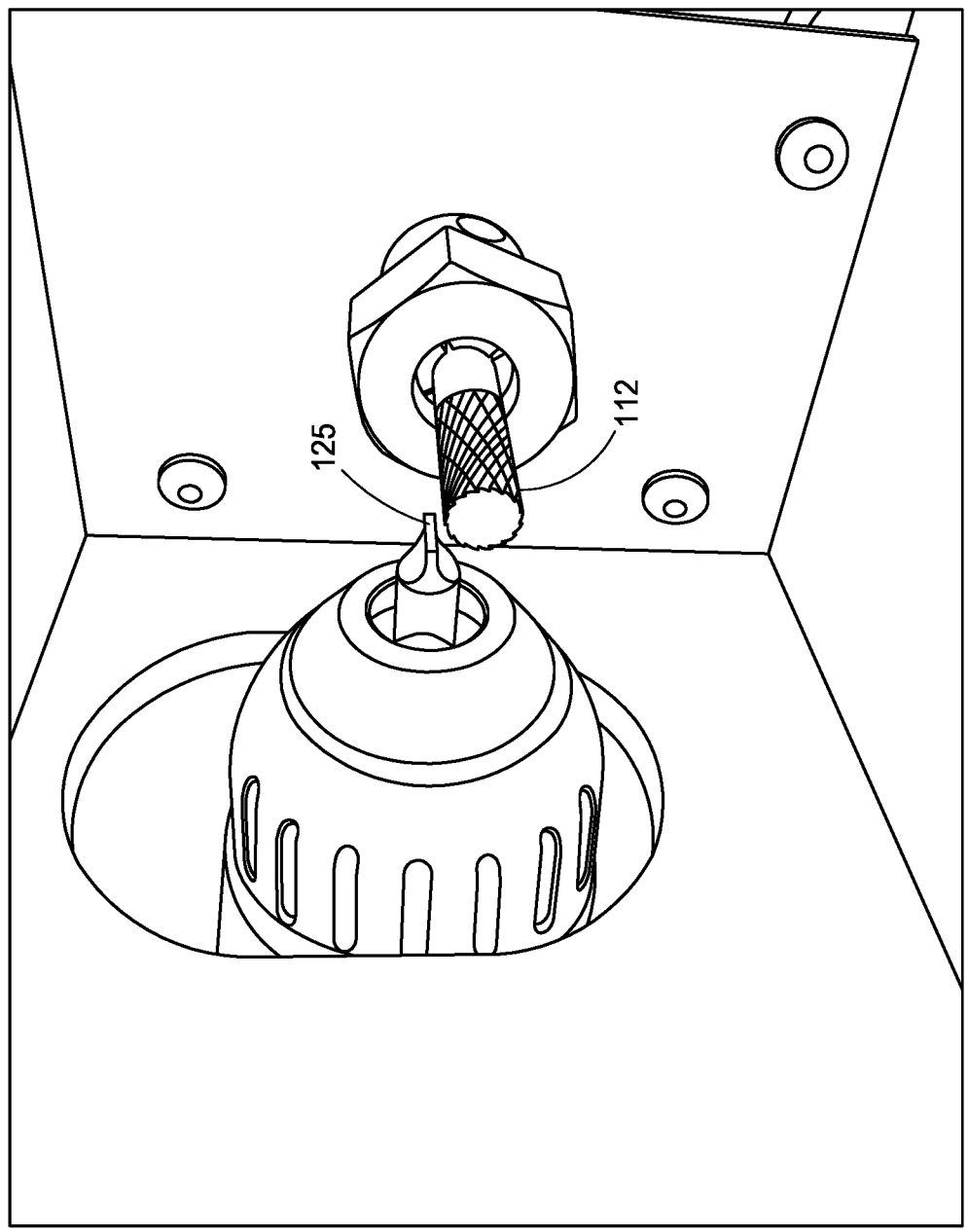

FIG. 17 is a depiction of a driver tip engaging a cutting head according to an embodiment of the disclosure.

Figure 18:
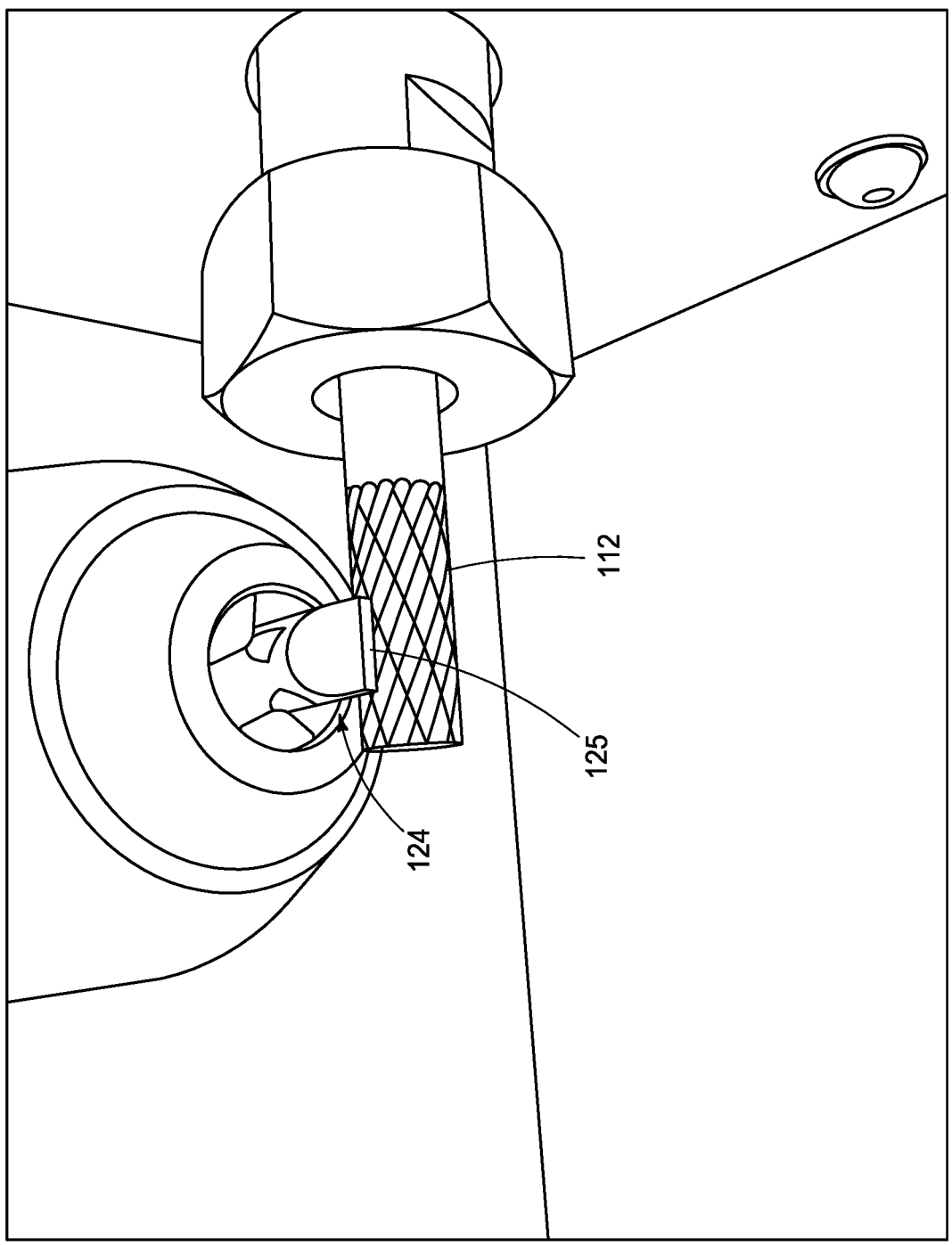

FIG. 18 is a depiction of a driver tip engaging a cutting head according to an embodiment of the disclosure.

Figure 19:
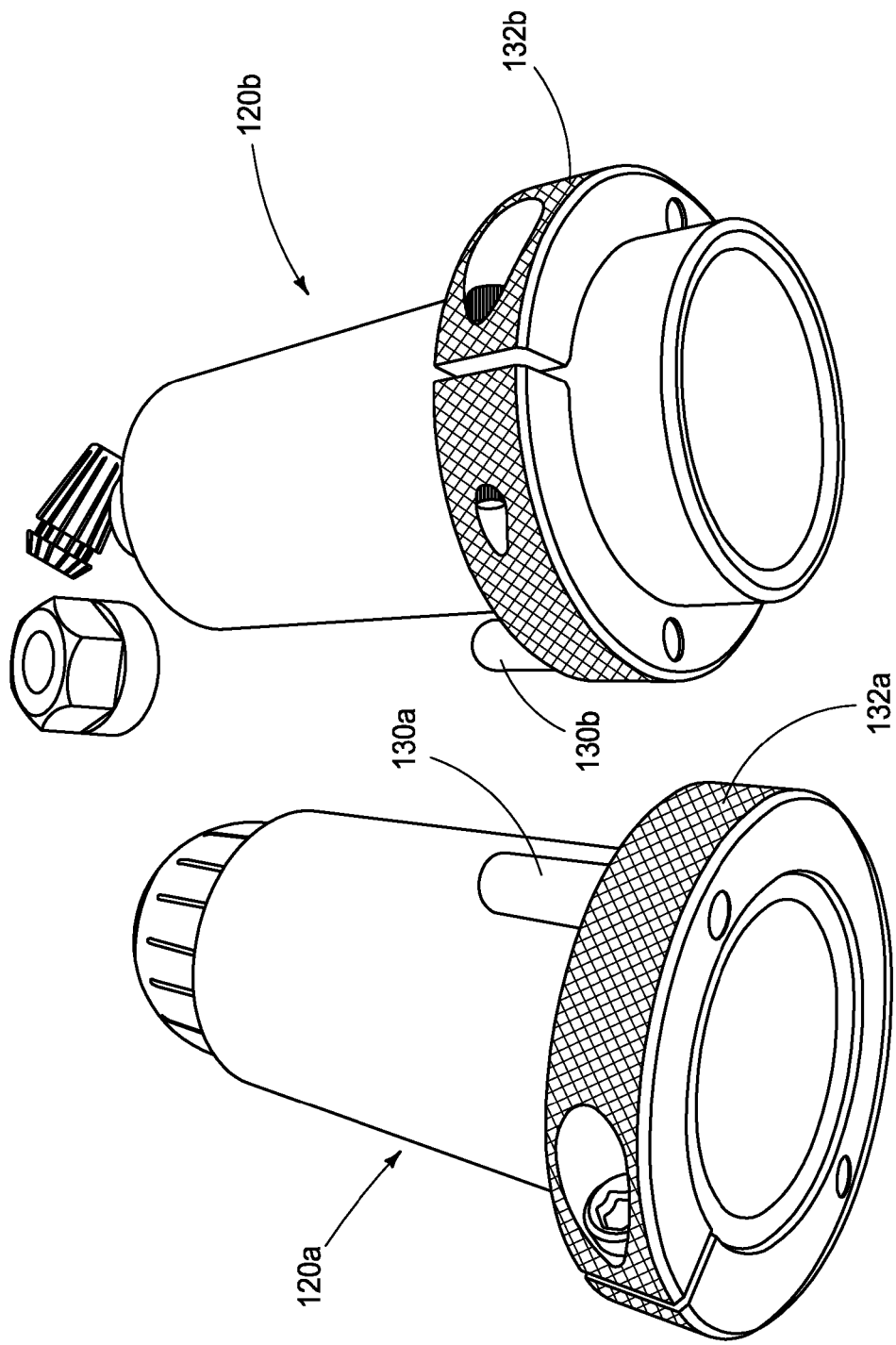

FIG. 19 is a depiction of two driver support assemblies according to an embodiment of the disclosure.

Figure 20:
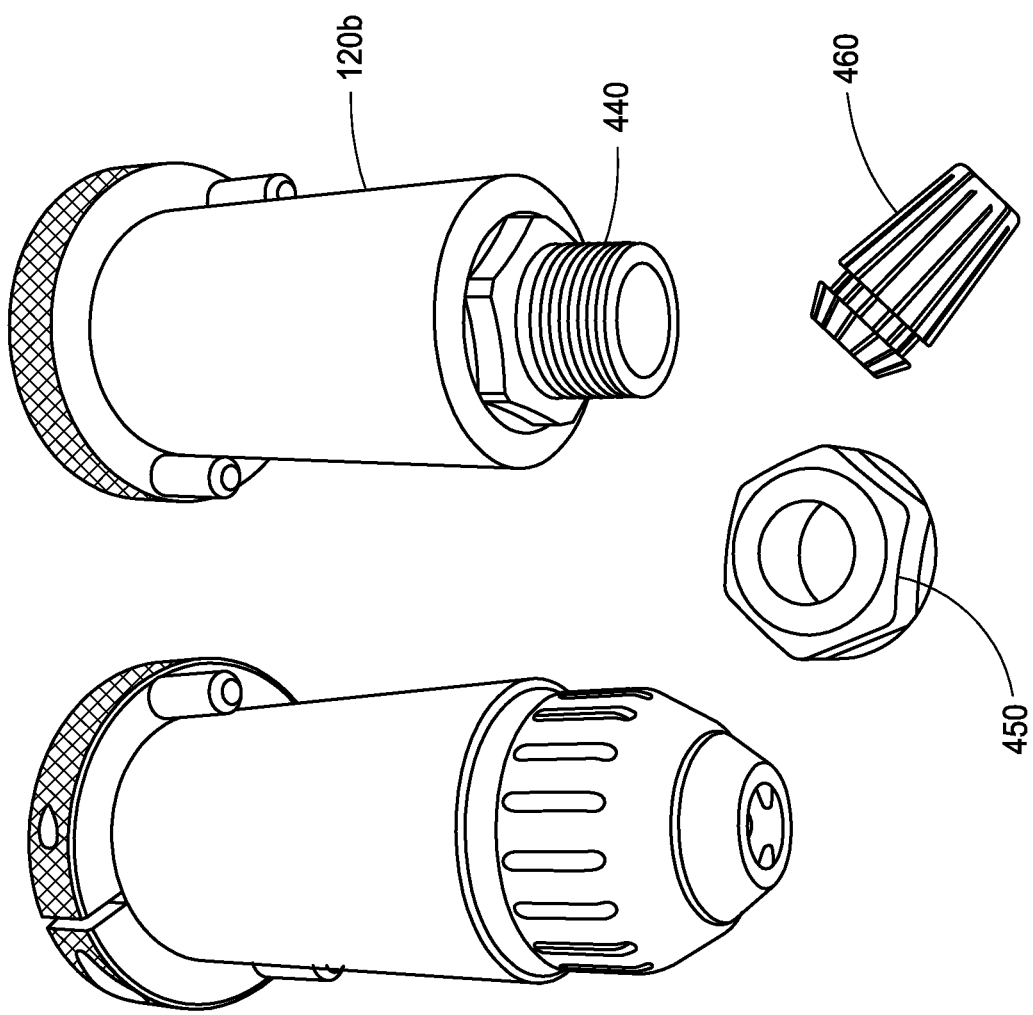

FIG. 20 is a depiction of one driver support assembly and another driver support assembly depicting a threaded portion and collet and a nut engaged therein.

Figure 22:
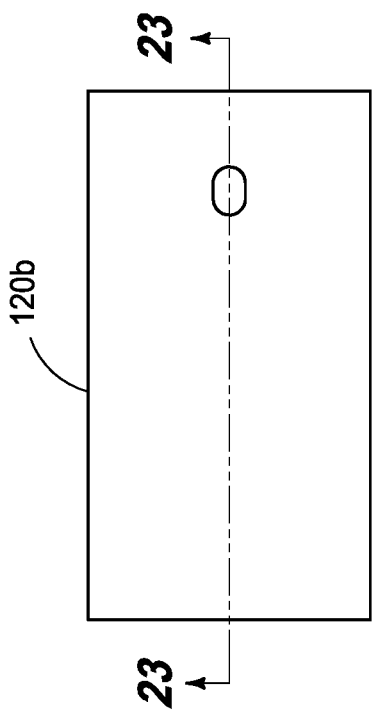
Figure 23:
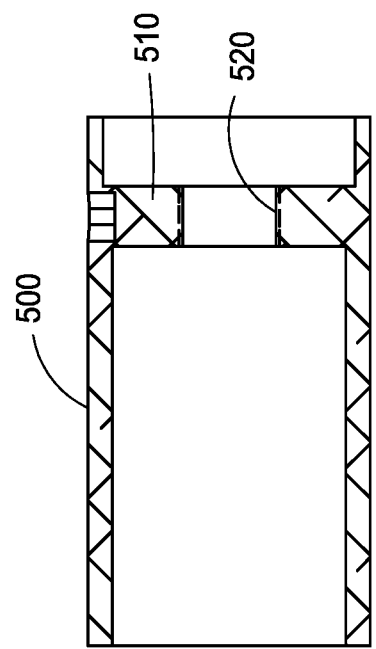
Figure 21:
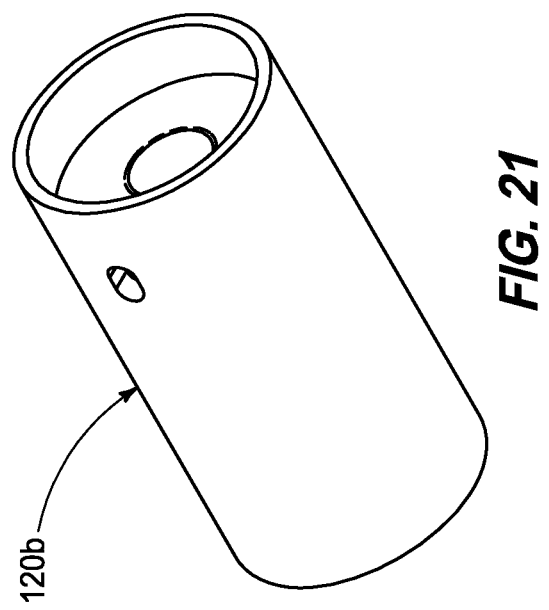
Figure 27:
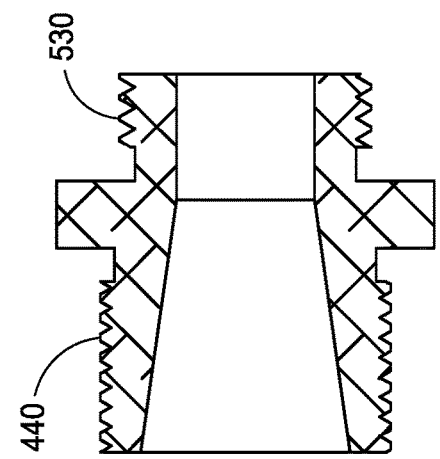
Figure 26:
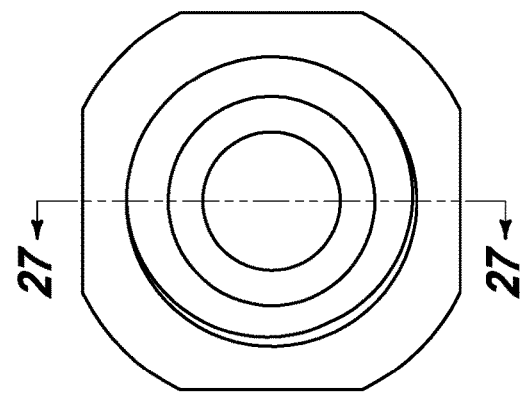
Figure 24:
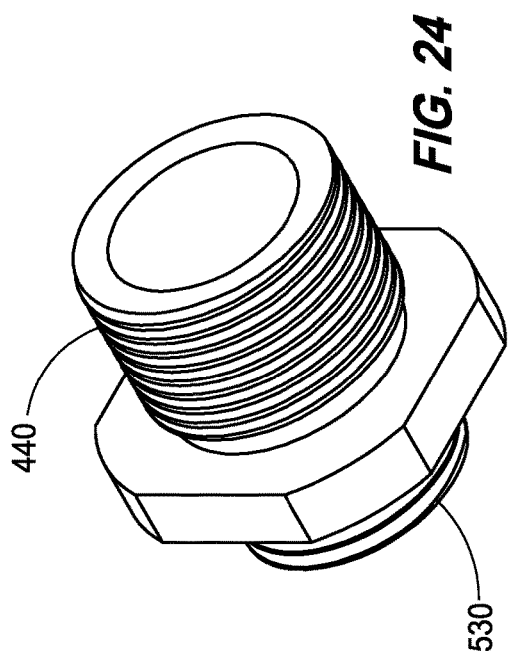
Figure 25:
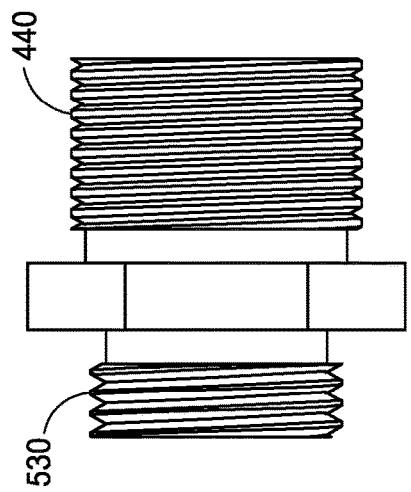

FIGS. 21-23 are depictions of a driver support assembly body according to an embodiment of the disclosure.

FIGS. 24-27 are a depiction of a collet receiving flange according to an embodiment of the disclosure.

Figure 30:
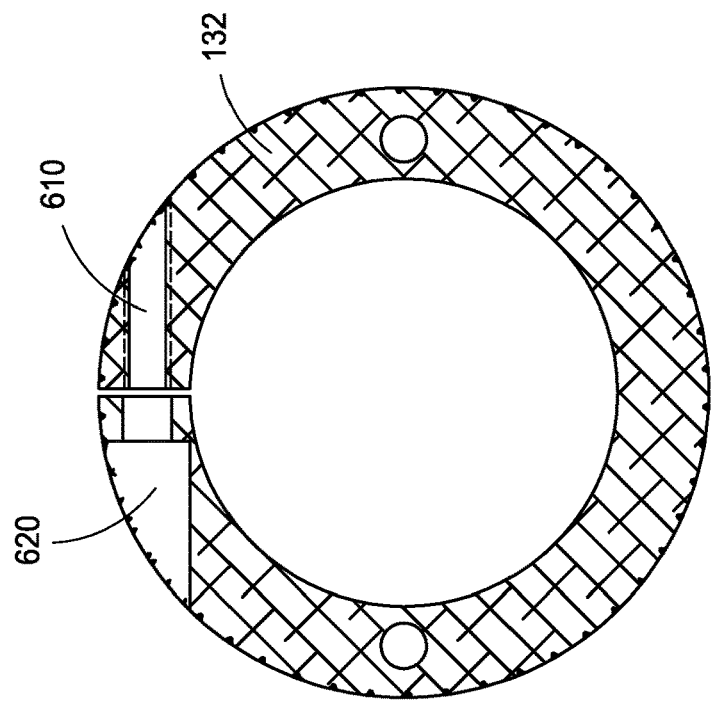
Figure 29:
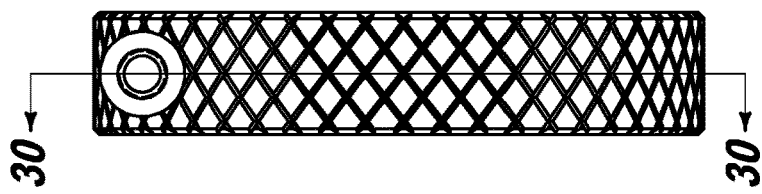
Figure 28:
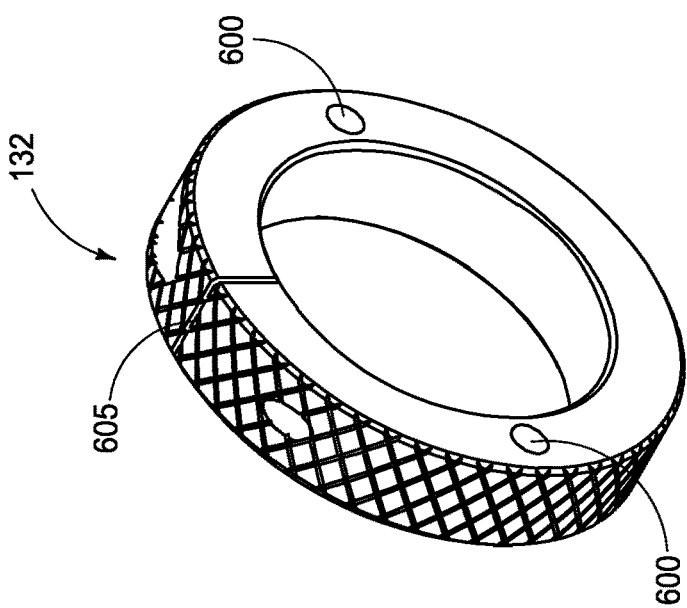

FIGS. 28-30 are depictions of a secondary construct according to an embodiment of the disclosure.

Figure 31:
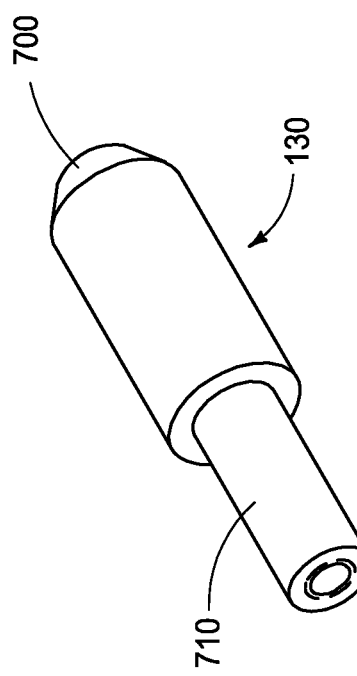
Figure 32:
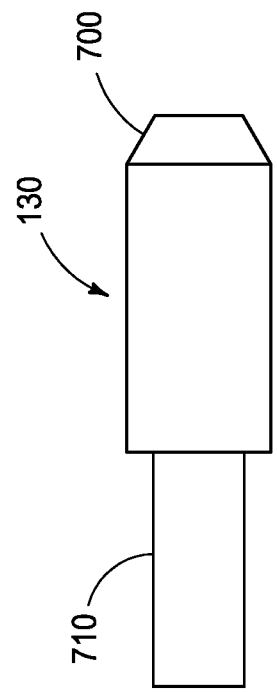

FIGS. 31-32 are depictions of a primary construct according to an embodiment of the disclosure.

Figure 33:
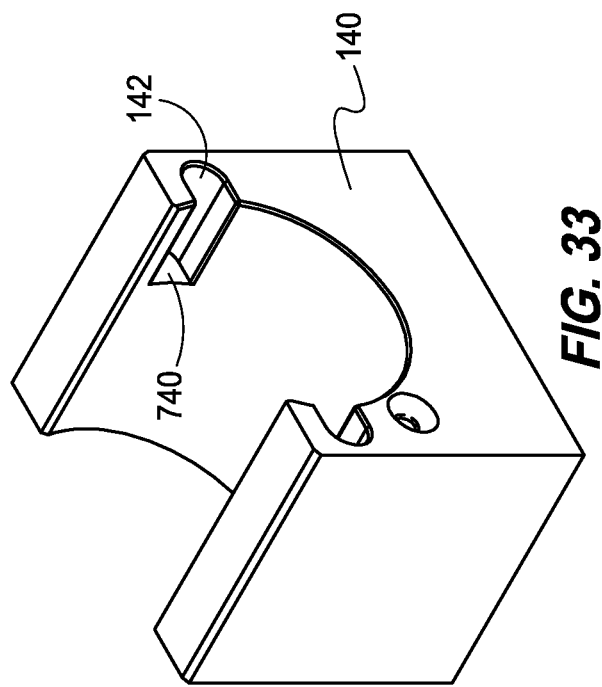
Figure 34:
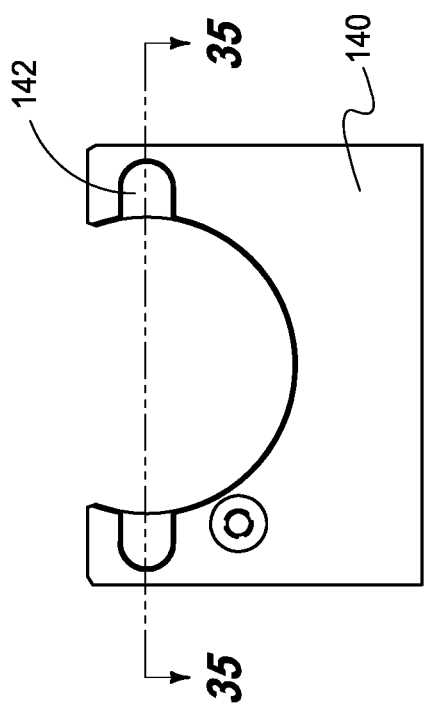
Figure 35:
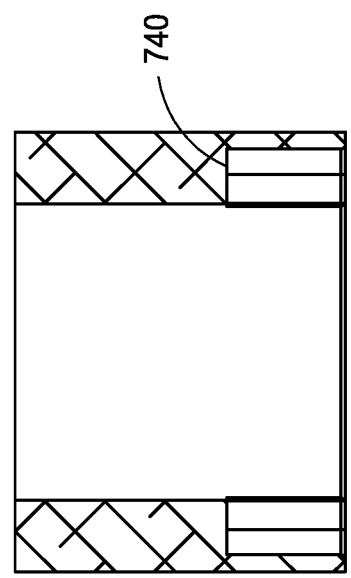

FIGS. 33-35 are depictions of a setup cradle according to an embodiment of the disclosure.

Figure 37:
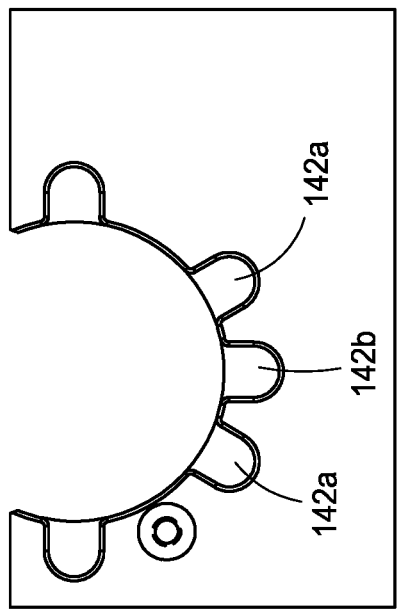
Figure 36:
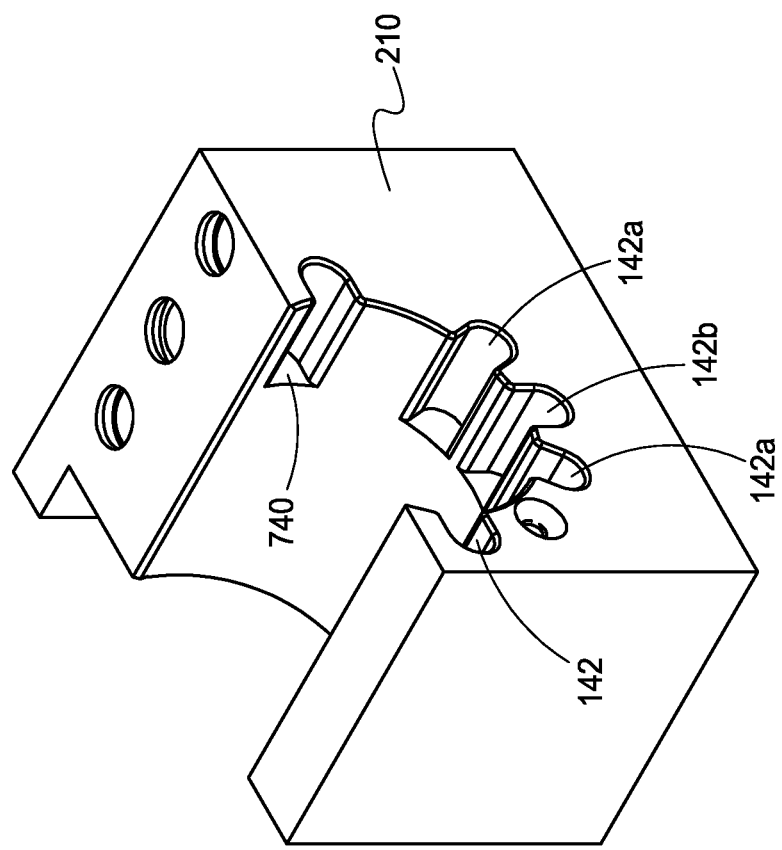

FIG. 36-37 are depictions of a cutting cradle according to an embodiment of the disclosure.

Figure 40:
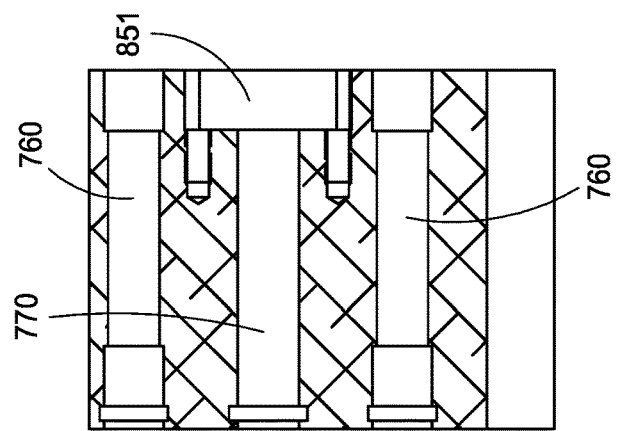
Figure 39:
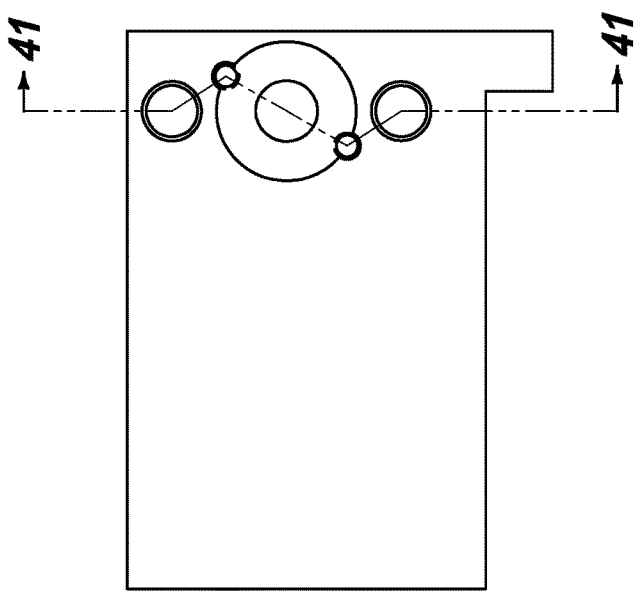
Figure 38:
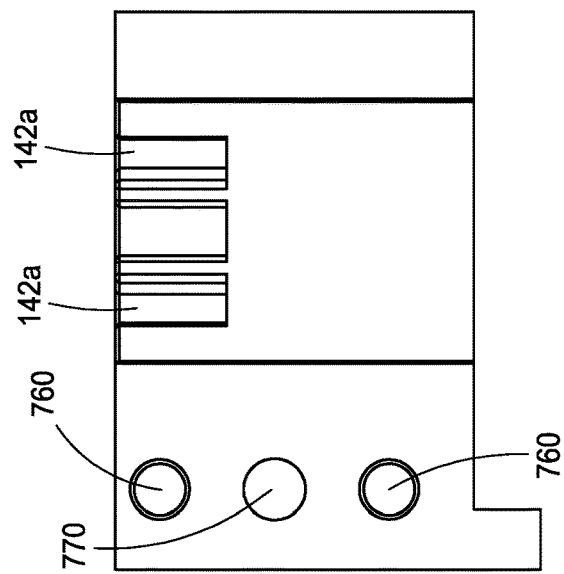

FIGS. 38-40 are additional depictions of a cutting cradle according to an embodiment of the disclosure.

Figure 43:
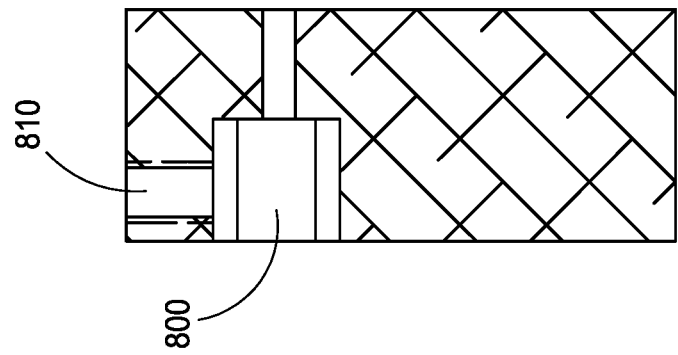
Figure 42:
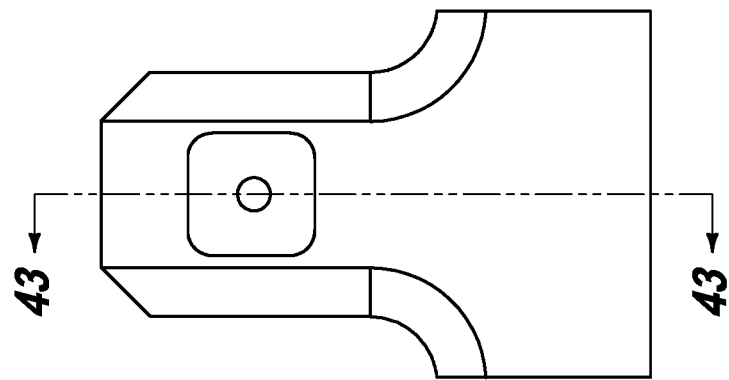
Figure 41:
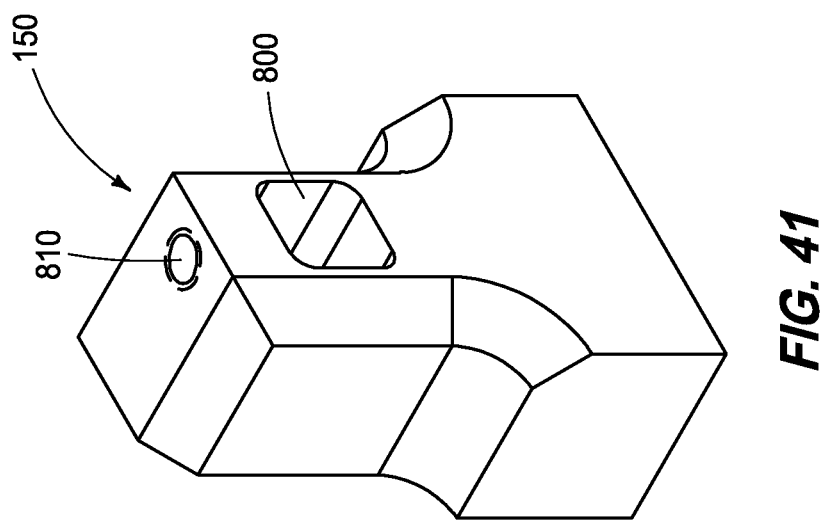

FIGS. 41-43 are depictions of a tip guide according to an embodiment of the disclosure.

FIGS. 44-47 are depictions of a tip guide block according to an embodiment of the disclosure.

Figure 49:
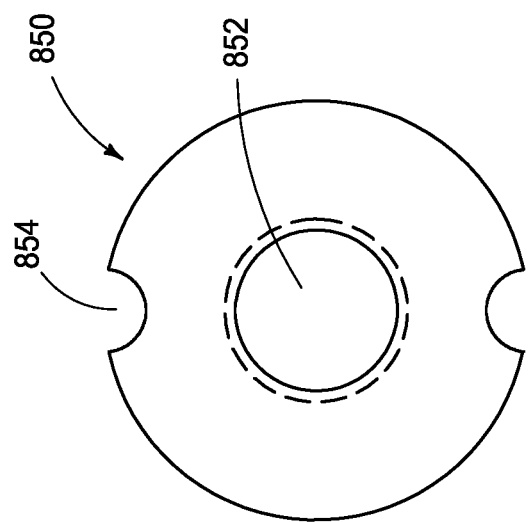
Figure 48:
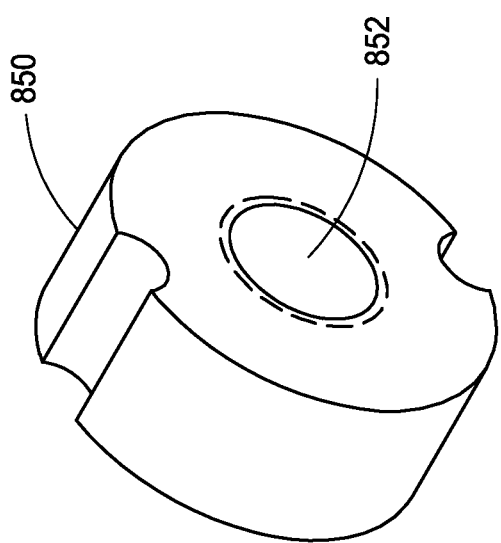

FIGS. 48-49 are depictions of a micrometer column receiving nut according to an embodiment of the disclosure.

Figure 52:
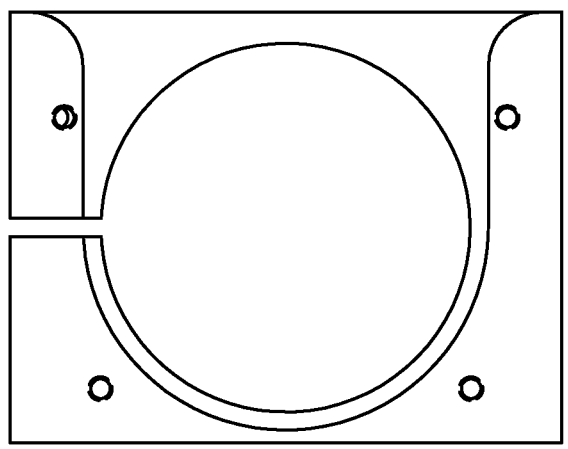
Figure 51:
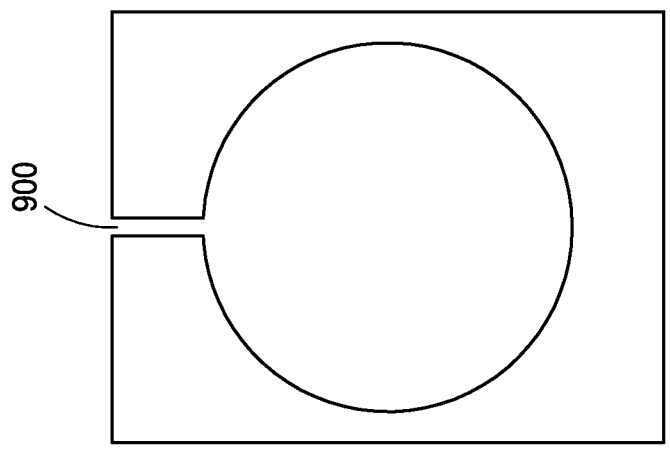
Figure 50:
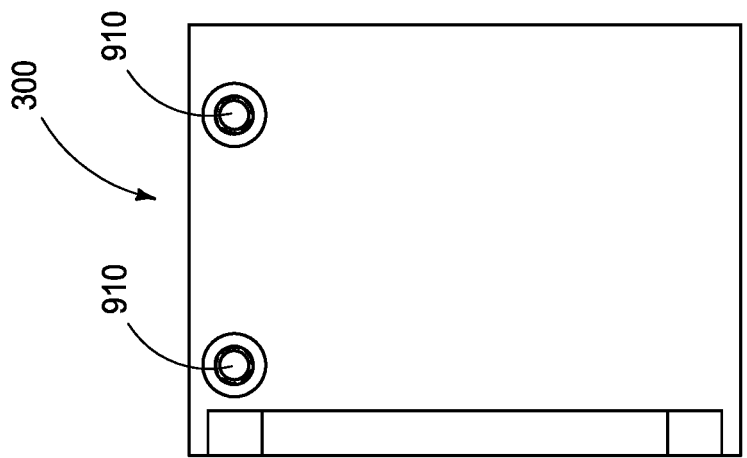

FIGS. 50-52 are depictions of motor mounts according to an embodiment of the disclosure.

FIG. 53 is a depiction of the cutting chamber opening according to an embodiment of the disclosure.

Figure 56:
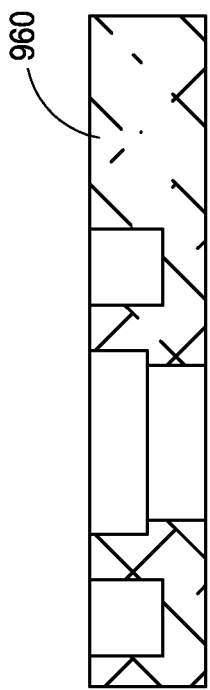
Figure 55:
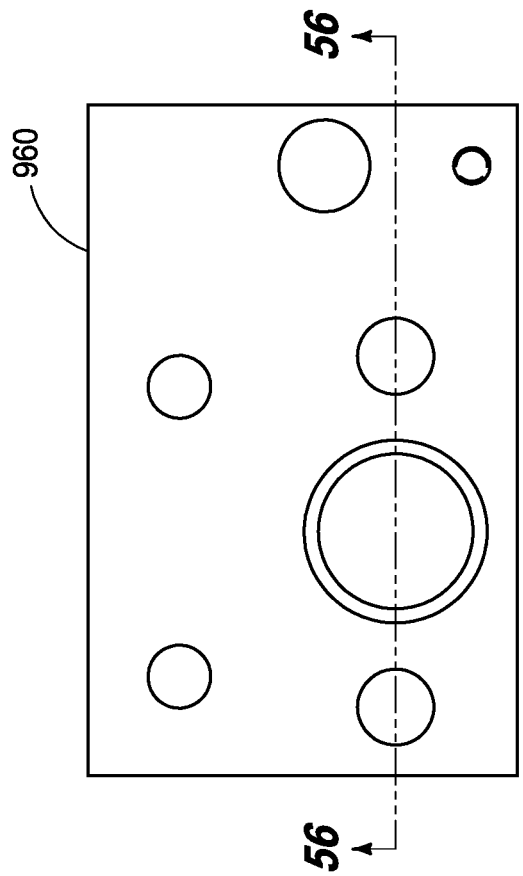
Figure 54:
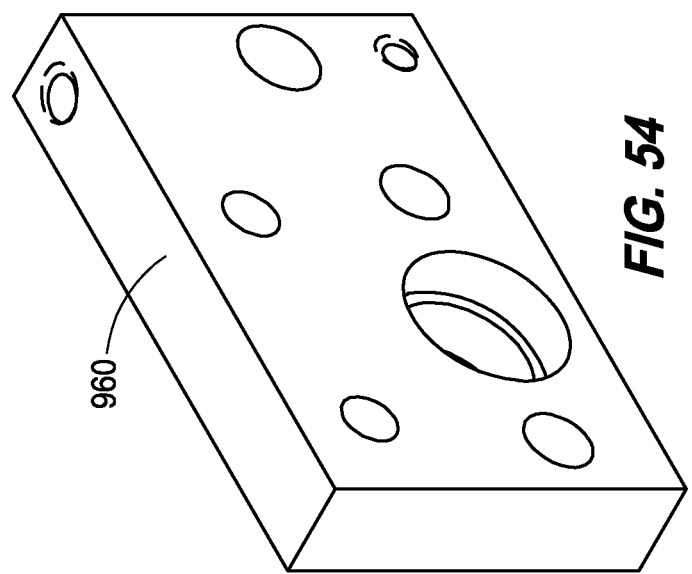

FIGS. 54-56 are depictions of the cutting cradle lift cap according to an embodiment of the disclosure.

Figure 57:
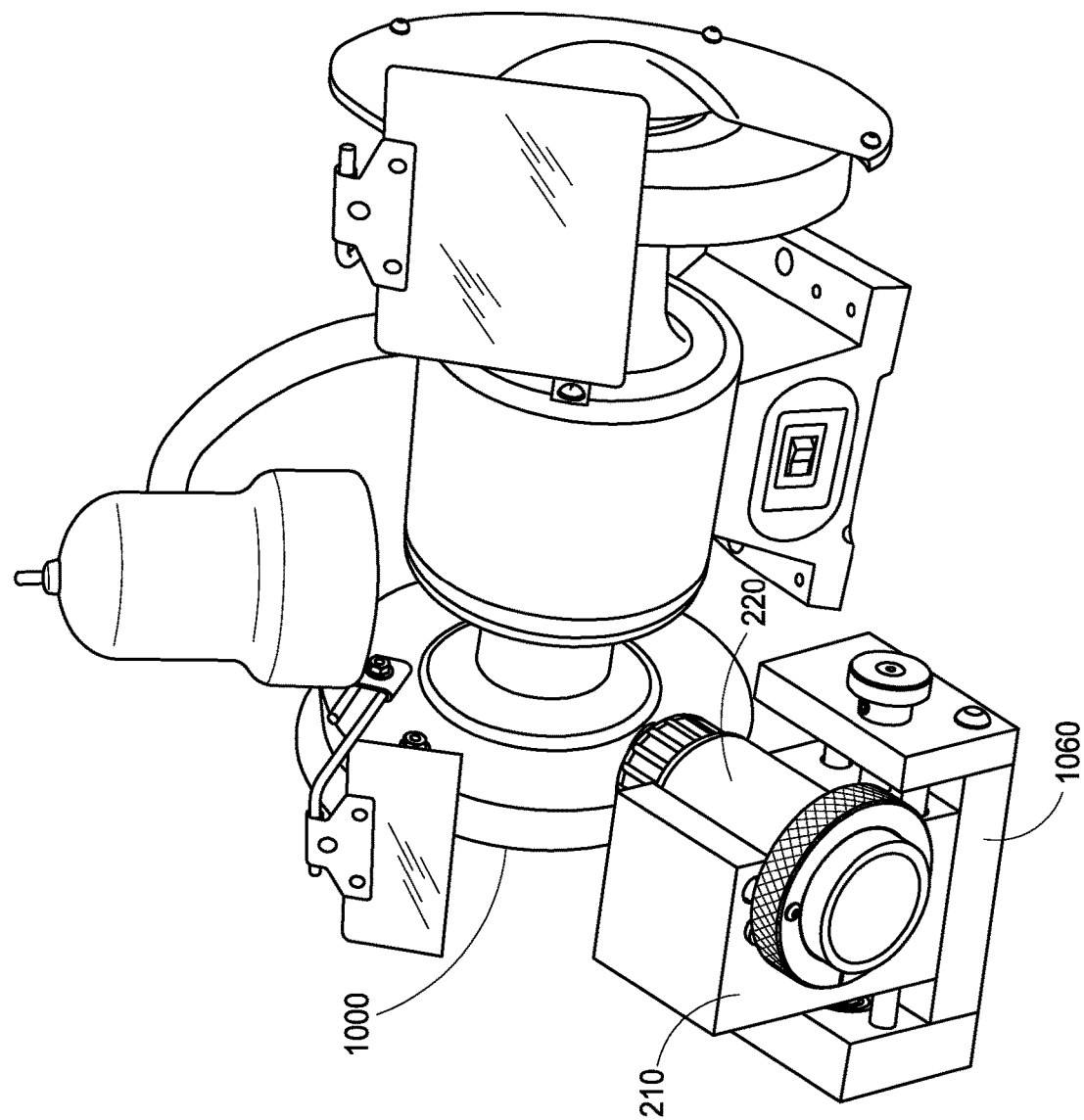

FIG. 57 is a depiction of an alternative embodiment of a cutting cradle engaged with a platform engaging an alternative cutting device according to an embodiment of the disclosure.

Figure 58:
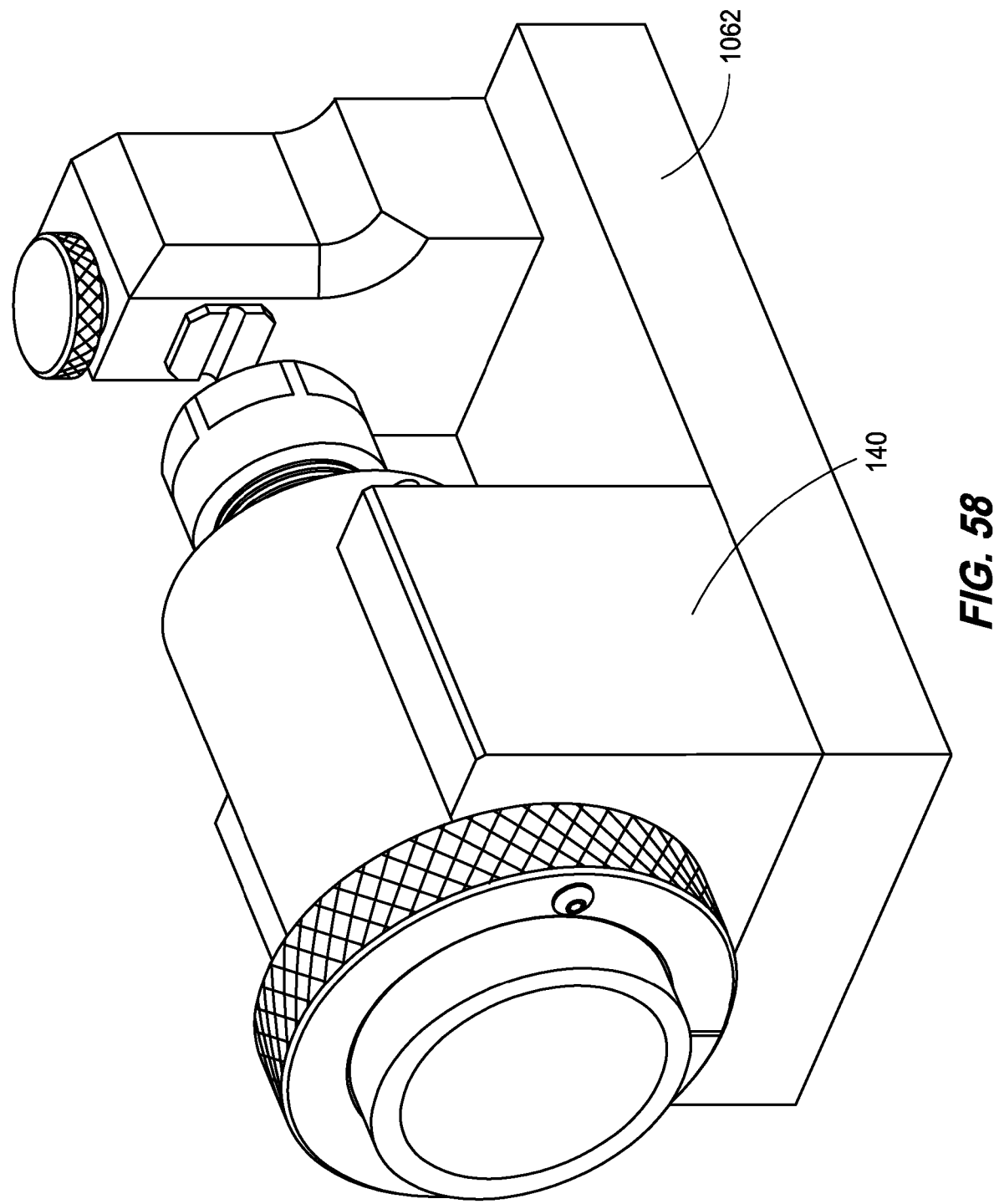

FIG. 58 is a depiction of a setup assembly engaged with a driver support assembly according to an embodiment of the disclosure.

DESCRIPTION

This disclosure is submitted in furtherance of the constitutional purposes of the U.S. Patent Laws "to promote the progress of science and useful arts" (Article 1, Section 8).

The present disclosure will be described with reference to FIGS. 1-58. In order to describe the invention as part of a process, the description will begin with a discussion of FIG. 2, and particularly, the driver support assembly of FIG. 2. Driver support assembly 20 can be configured to work in concert with a setup assembly which will be described later.

Driver support assembly 20 can include a body 22 which can define a hollow chamber configured to receive a shaft 24 therethrough. Body 22 can also be configured to receive a handle 26 of a driver that is fixedly coupled to shaft 24. Assembly 20 can also include a collet or adjustable jaws 28 which can be configured to receive the shaft and operably engage the shaft to secure the shaft in fixed relation to the body.

Assembly 20 also includes at least one fixed construct 30 in fixed relation to the body, with the construct configured to align assembly 20 with the setup assembly. The one fixed construct can be permanently coupled to the body or removably coupled to the body. For example, the one fixed construct may be manipulated in relation to the body prior to engaging the driver support assembly with the setup assembly.

In addition to assembly 20, along this fixed construct 30 can be an additional construct 32 that provides the relation of support assembly 20 to a setup assembly. In accordance with example implementations, construct 32 can define the depth to which the driver support assembly engages the setup assembly.

In accordance with example implementations, driver support assembly 20 can be considered at least part or a portion of a chuck head, and this chuck head can have subassemblies therewith, at least part of which can include a collet or adjustable jaws 28 and cap portion 34 for engaging and securing shaft 24 of the driver. The subassembly 28 can hold a round, square or hex shaped shaft 24, for example, and the subassembly 28 can have opening dimensions to receive shafts 24 that range between as small as 1/64 of an inch to as large as 1/2 of an inch, for example. In accordance with example implementations, the collet or adjustable jaws of subassembly 28 can be as long as 1 1/4 inch and may have a flange associated therewith, at least at a terminal end thereof.

Engaging the collet or adjustable jaws with assembly 20 can include providing a threaded portion of body 22 that can engage a cap portion 34 subassembly that can be utilized to bias the collet or adjustable jaws 28 in a restricted configuration against shaft 24. According to example implementations, cap portion 34 subassembly is threaded onto body 22. The overall length of cap portion 34 subassembly can be between 0.500 to 2.500 inches.

Figure 1:
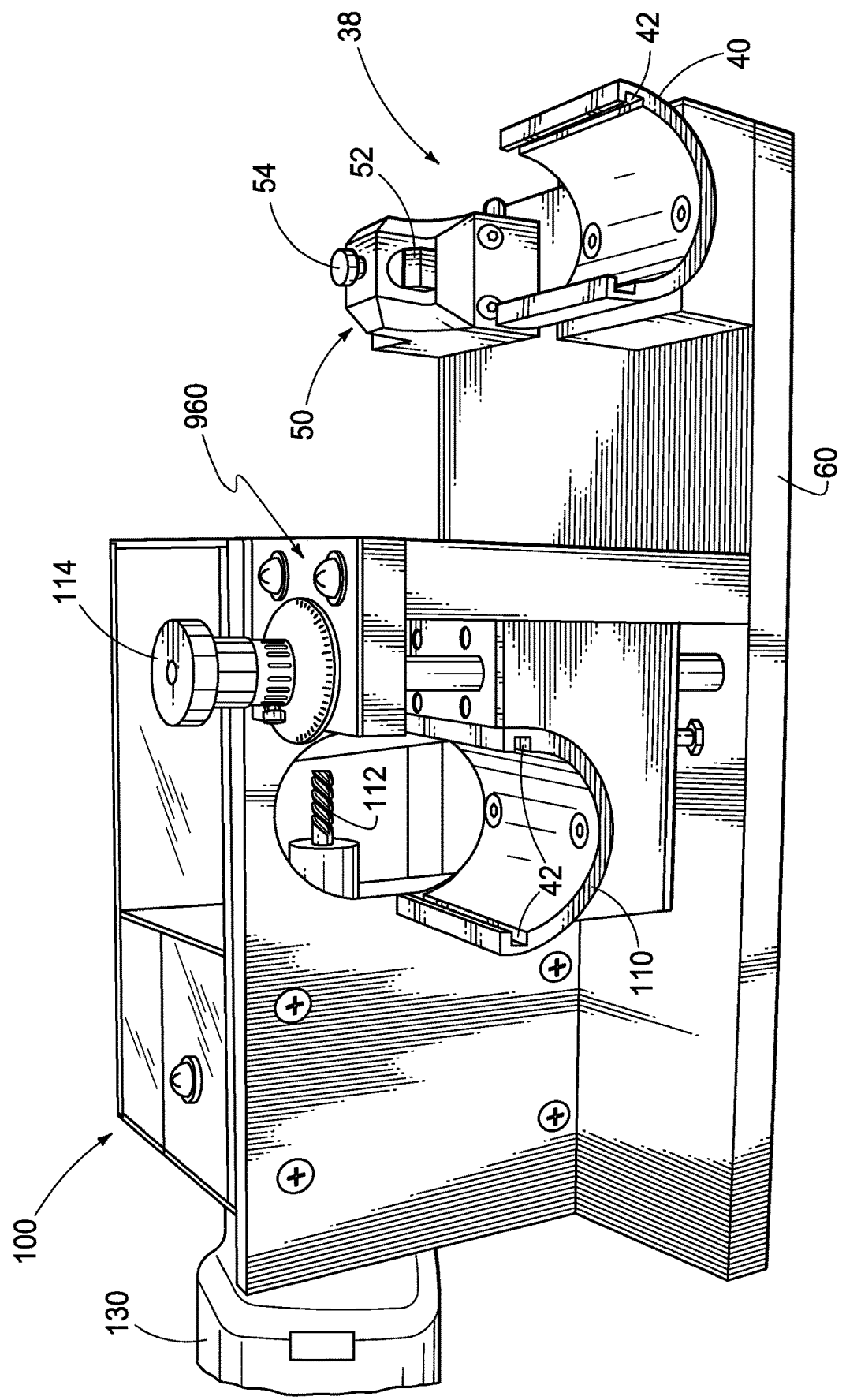
FIG. 1 is a depiction of a cutting assembly according to an embodiment of the disclosure.
Figure 2:
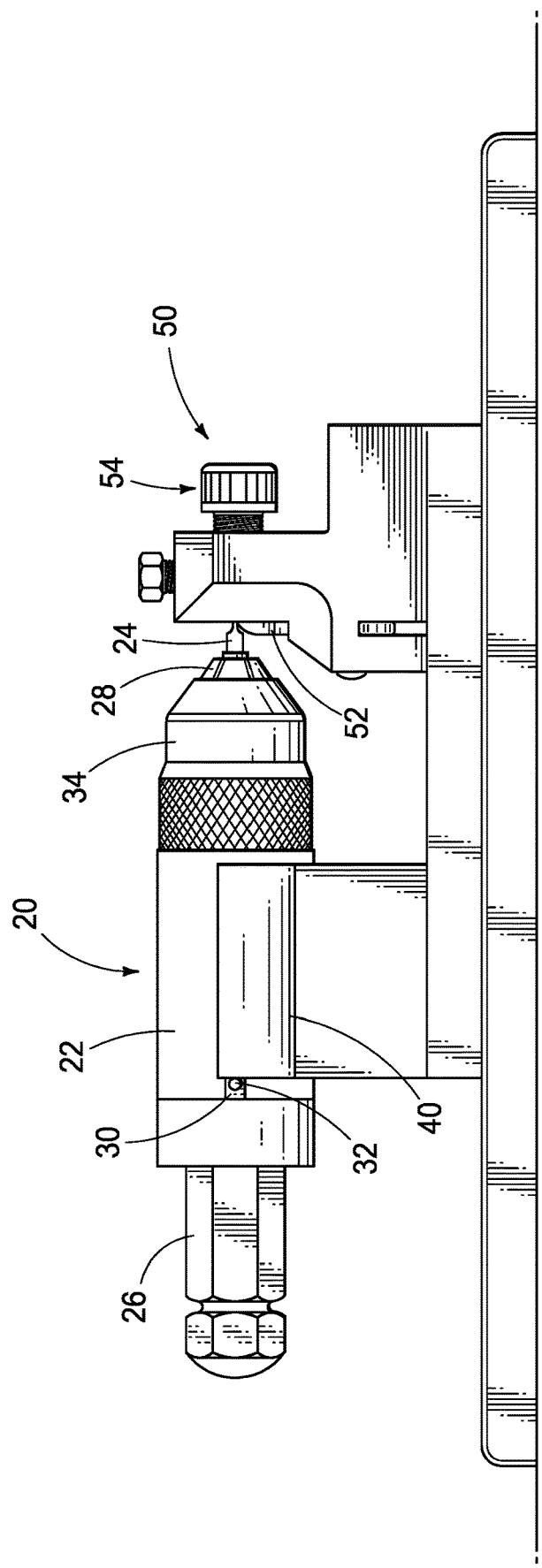
FIG. 2 is a depiction of a setup assembly according to an embodiment of the disclosure.

As can be seen in FIG. 2, assembly 20 can be supported by a setup cradle 40 and is operably aligned with a setup shaft head alignment assembly 50. Referring again to FIG. 1, setup assembly 38 can be configured to work in concert with shaft receiving support assembly 20 and a cutting assembly 100. In accordance with example implementations, cutting assembly 100 and setup assembly 38 may share a base 60. Setup assembly 38 can include a setup cradle configured to receive body 22 of driver support assembly 20 as well as fixed construct 30 within receiving channel 42. While shown with two fixed constructs 30, support assembly 38 may alternatively include a single fixed construct.

As shown, receiving channels 42 are opposing one another wherein at least one cross-section of body 22 would include at least two fixed constructs diametrically opposing one another in one cross section. Construct and channel 42 can be configured to align body 22 with setup shaft head alignment assembly 50. In accordance with alternative configurations, setup cradle 40 can include a single receiving channel or opening.

Referencing the drawings of this specific disclosure, body 22 and setup cradle 40 are shown in substantially cylindrical form. However, other forms are contemplated, including square, straight-edged, and hexagonal forms in cross-sections as well. The body and setup cradle may have complimentary configurations. For example, the setup cradle can be a half-circle in one cross section and the body can be tubular or cylindrical in one cross section with the half-circle engaging the body. In accordance with alternative configurations, the setup cradle may be a full circle in one cross section.

In accordance with example configurations, assembly 50 can include a beveled shaft head guide 52 that may or may not be biased within assembly 50. This guide can be configured to square the alignment of an existing tip and shaft in relation to the construct. The biasing may or may not include a spring biasing to extend 52 upwardly in relation to base 60. As mentioned, guide 52 can include a bevel. As shown this bevel is a curved bevel. Other forms of beveling can be utilized, including straight-edged beveling, for example. In accordance with example implementations, adjustment mechanisms 54 may be used in concert or alone to adjust the relation of guide 52 in relation to shaft heads 24. In accordance with example implementations, body 22 is extended to construct 32 and shaft 24 is extended through body 22 to abut with assembly 50. Cap 34 is tightened to constrict collet or adjustable jaws 28, fixing shaft 24 in relation to body 22 and construct 30. As shown, setup assembly 38, assembly 50, and setup cradle 40 are fixed in relation to one another, with the adjustment being the alignment of the guide 52.

Figure 3:
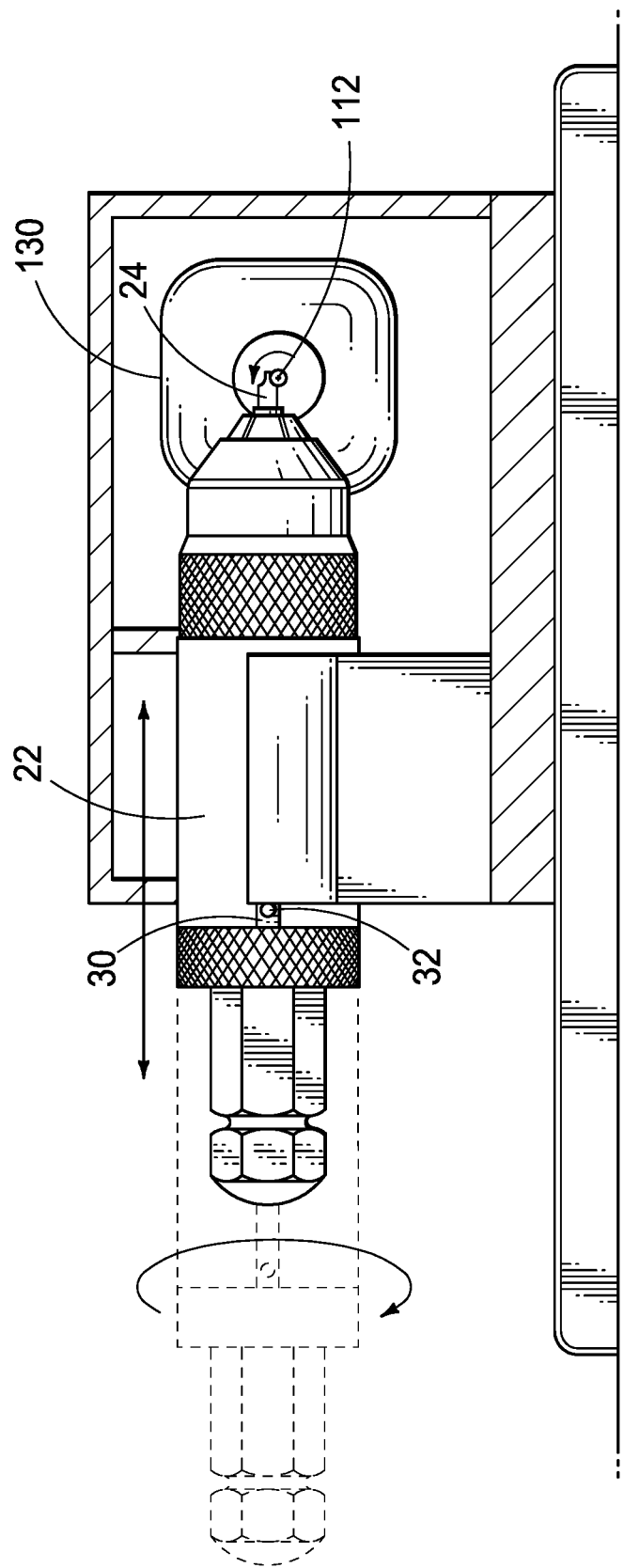
FIG. 3 is a view of the cutting assembly engaging the driver support assembly according to an embodiment of the disclosure.

Referring next to FIG. 1 and FIG. 3, for example, a cutting assembly 100 can be configured to work in concert with a support assembly that has been aligned utilizing setup assembly 38. Referring now to FIGS. 1 and 3, assembly 100 can include cutting cradle 110. Cutting cradle 110 can be adjustable in relation to cutting head 112. As shown, cutting cradle 110 can be provided normally in relation to shaft 24 as it engages cutting head 112. In accordance with example configurations, cutting cradle may be configured to engage the driver support assembly. Accordingly, the cutting cradle may have a complimentary shape. The cutting cradle may have at least one opening or channel 42, for example when configured to a half-circle in one cross section. The cutting cradle may also be configured to have at least two openings or channels 42 when configured in a half or full circle in one cross section.

The elevation of cutting cradle 110 can be adjusted with a micrometer adjuster 114 that may be utilized to adjust the relationship between the cutting head 112 and shaft 24. In accordance with example implementations, micrometer guide 114 can be utilized to define the desirable tip dimensions of shaft 24. Cutting head 112 may be coupled to motor 130, for example. It is also contemplated that cutting cradle 110 be in a fixed position and a micrometer adjuster movably operates the location of motor 130 and cutting head 112 assembly in relationship to shaft 24.

In operation, driver support assembly 20 can be manipulated forward and backward to engage cutting assembly 112 with stopping construct 32 determining the completion of the forward motion and the constructs 30 sealing the relation of body 22 in relation to cutting head 112. In accordance with example implementations, at least one side of shaft 24 can be cut, and assembly 20 removed from cutting cradle 110, rotated or turned upside down, and then re-engaged to cut the other side of head 24, thereby creating a shaft head of a specific dimension, diameter and/or shape as desirable.

Figure 4:
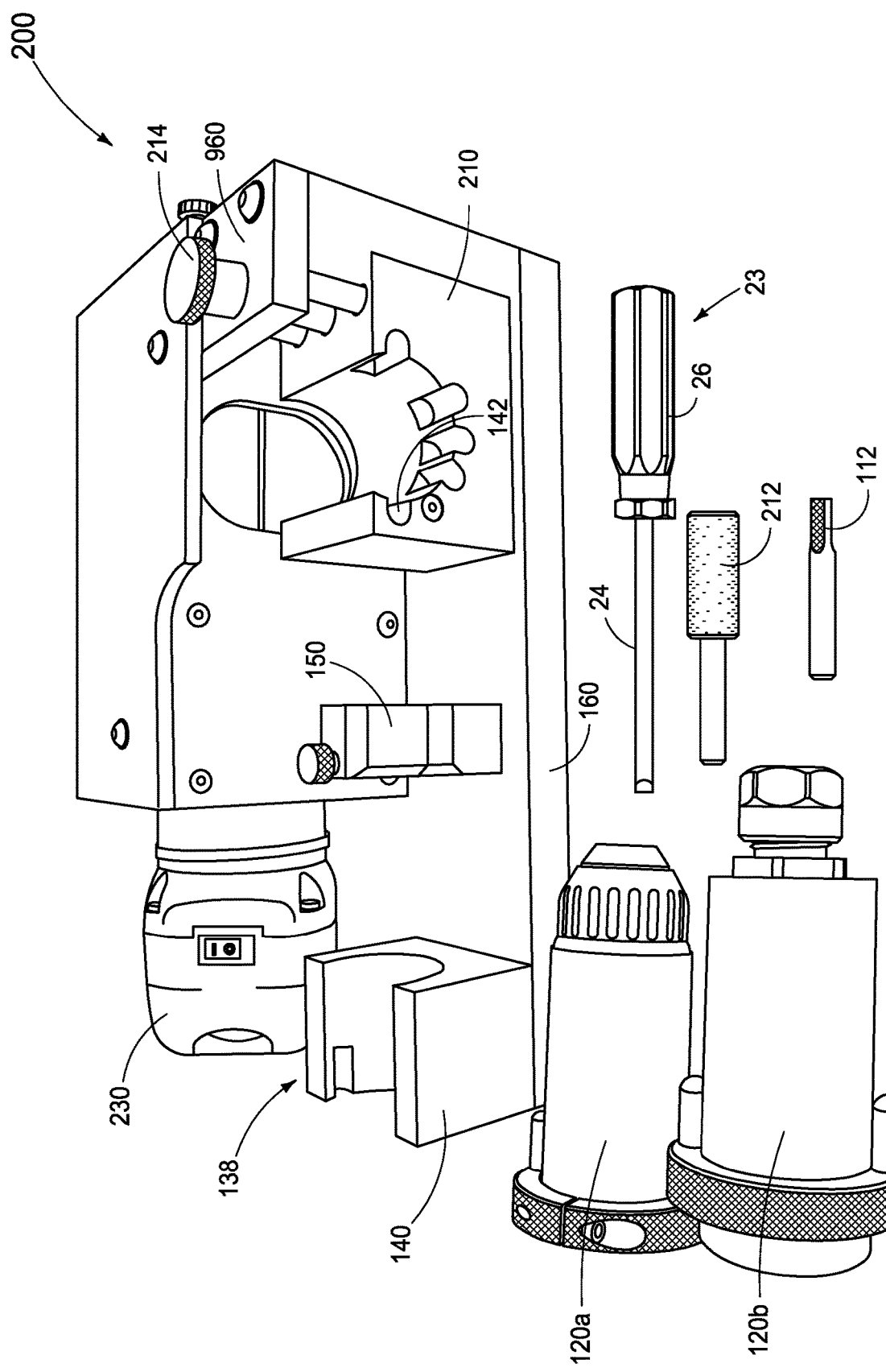
FIG. 4 is a depiction of a cutting assembly and kit according to an embodiment of the disclosure.

Referring next to FIG. 4, an entire cutting assembly including two driver support assemblies 120a and 120b, as well as driver 23 that includes shaft 24 and handle 26 is shown, along with cutting heads 112 and 212. In accordance with example embodiments, cutting assembly 200 be supported by the same platform or base 160 and upon base 160 can be setup assembly 138 which includes head alignment assembly 150 as well as cutting cradle 210 arranged normally to cutting head 112 when engaged.

Figure 5:
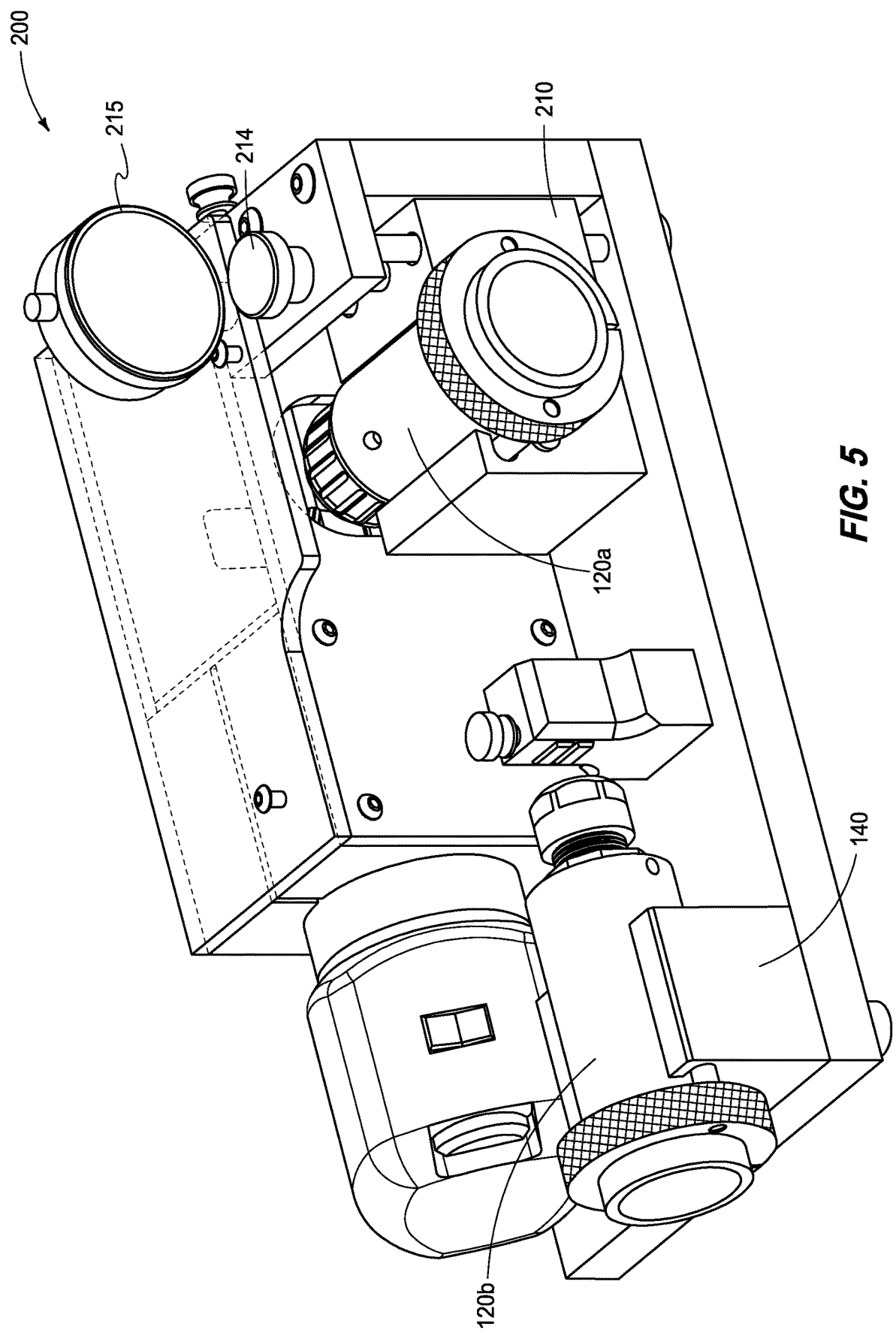
FIG. 5 is a depiction of a cutting assembly, setup assembly, and driver support assemblies according to an embodiment of the disclosure.

Referring next to FIG. 5, in a more detailed view, setup assembly 140 is shown having driver support assembly 120b engaged therein while driver support assembly 120a is engaged within cutting cradle 210. As shown, micrometer adjuster 214 is engaged to raise and lower cutting cradle 210 upon shaft assemblies via a lift assembly while being measured upon micrometer gauge 215.

Figure 6:
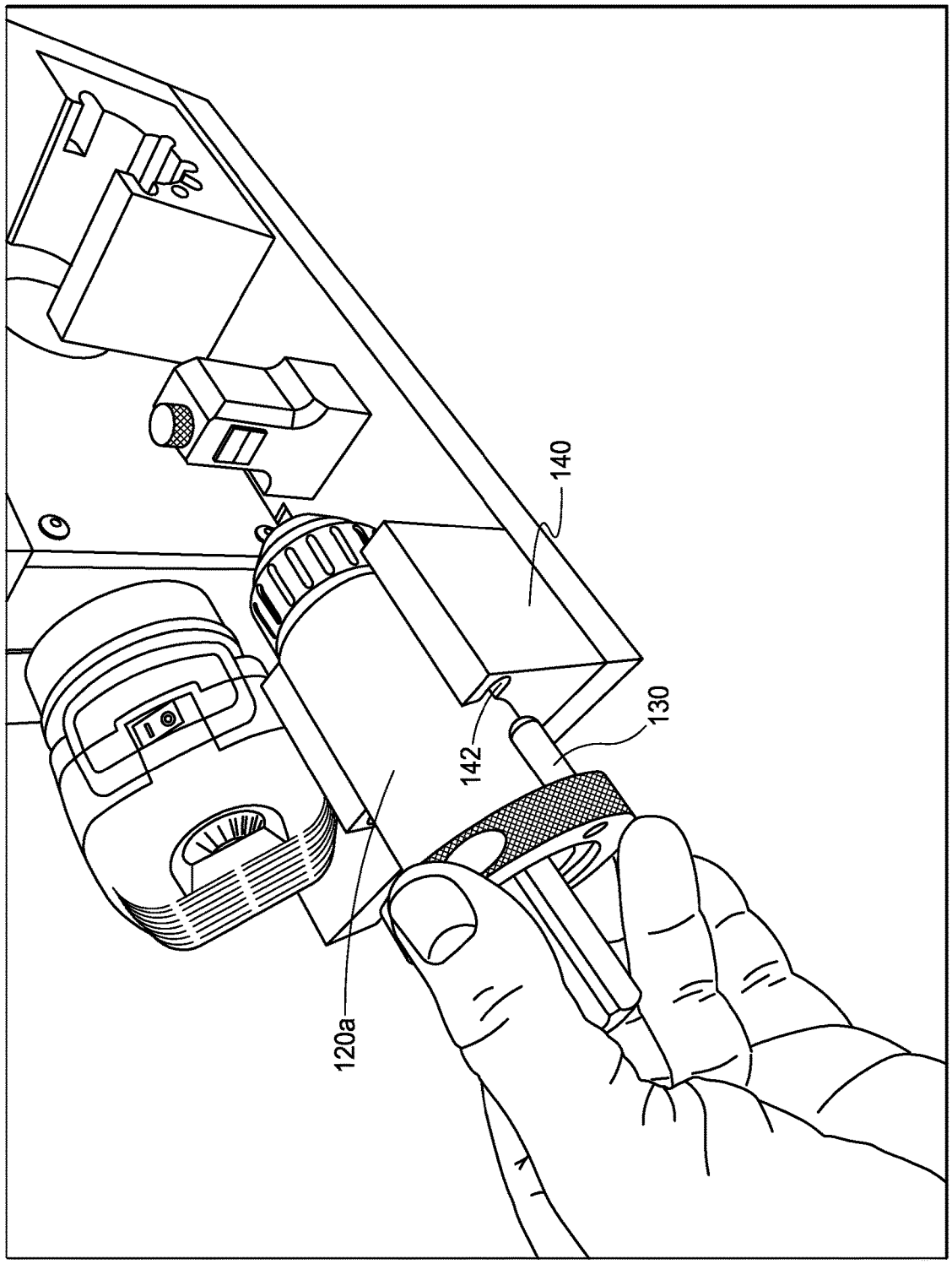
FIG. 6 is a depiction of a setup assembly utilizing a driver support assembly in one configuration according to an embodiment of the disclosure.
Figure 7:
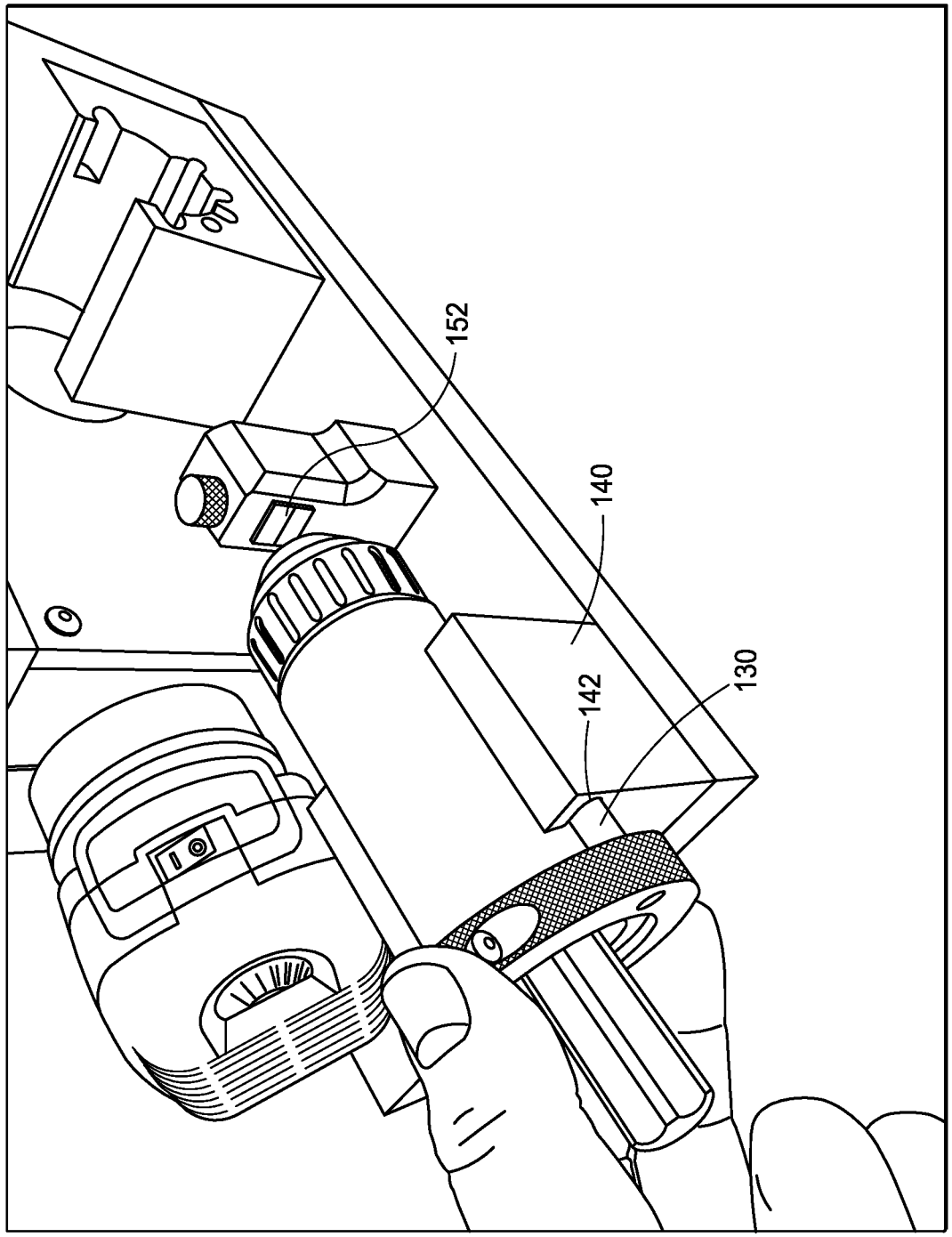
FIG. 7 is a depiction of the setup assembly of FIG. 6 in combination with a driver support assembly according to an embodiment of the disclosure.
Figure 8:
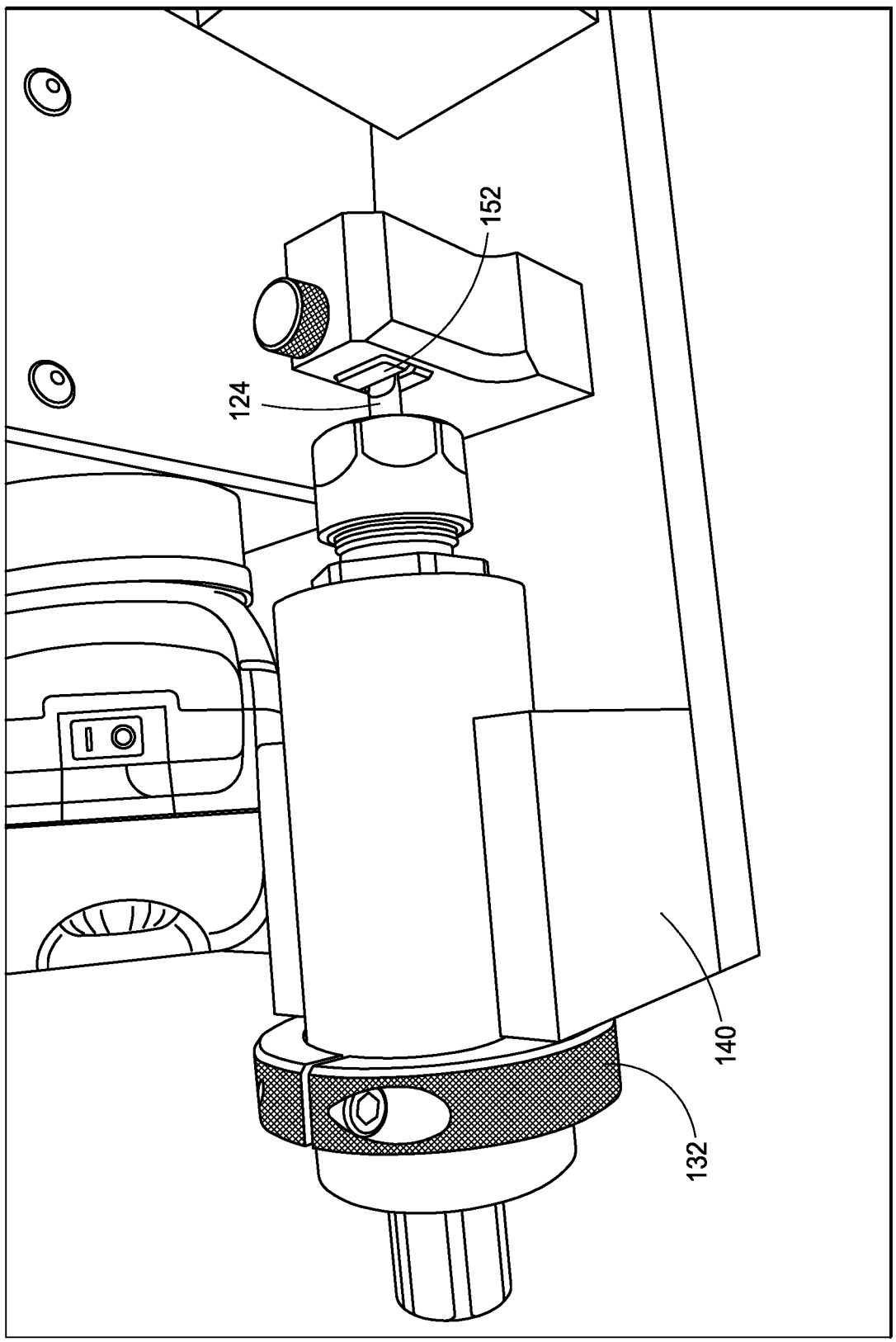
FIG. 8 is a depiction of the setup assembly of FIGS. 6 and 7 in combination with a driver support assembly according to an embodiment of the disclosure.

Referring next to FIG. 6, in accordance with one example implementation, driver support assembly 120a can be engaged to setup cradle 140. Within setup cradle 140 are channels 142, which can engage fixed construct 130. Referring next to FIG. 7, as fixed construct 130 engages channel 142, the tip of shaft 24 can engage head guide 152 as part of head alignment assembly 150. Referring next to FIG. 8, driver support assembly 120b is shown in its fully engaged position with additional construct 132 engaging setup cradle 140 and shaft 124 engaging head guide 152. In accordance with example implementations, additional construct 132 can physically contact setup cradle 140; however, in accordance with other implementations described herein, construct 130 may engage another portion of setup cradle 140.

Figure 9:
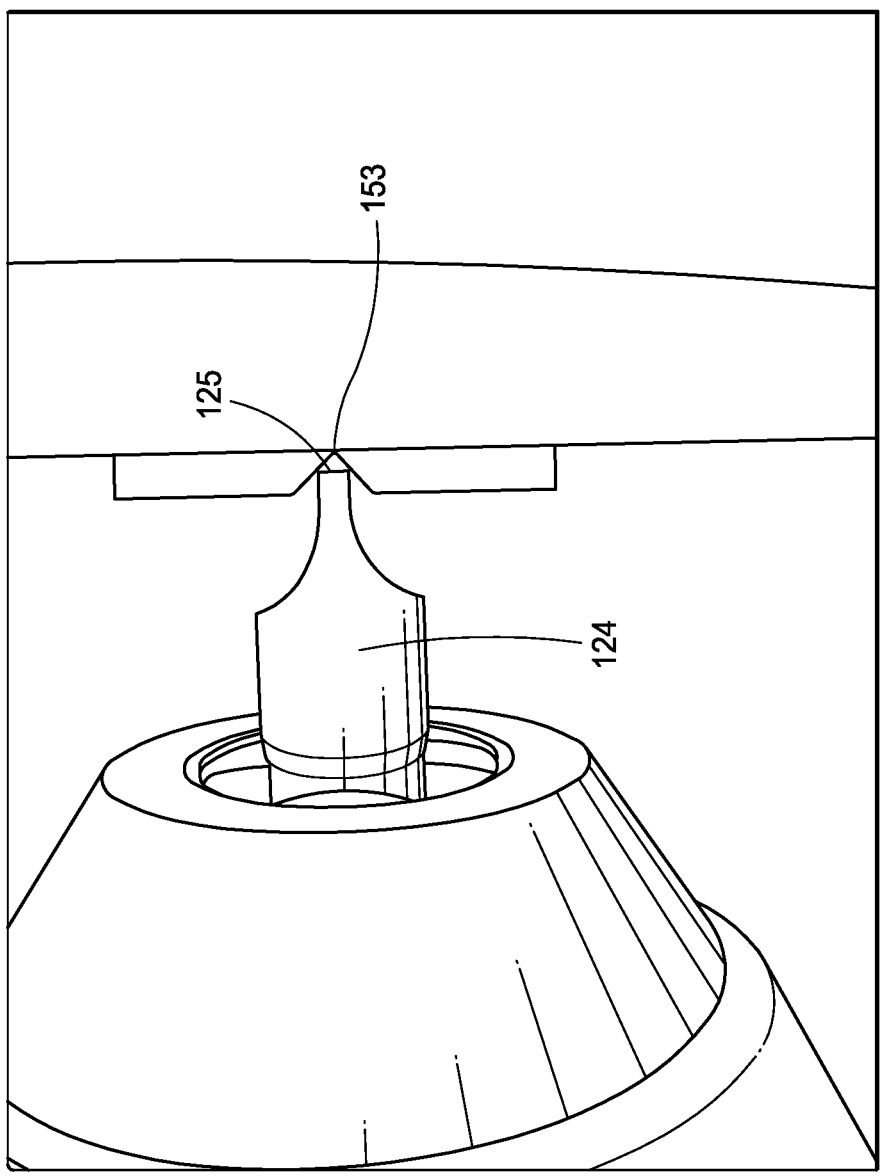
FIG. 9 is a depiction of a driver tip engaging a setup or tip guide according to an embodiment of the disclosure.
Figure 10:
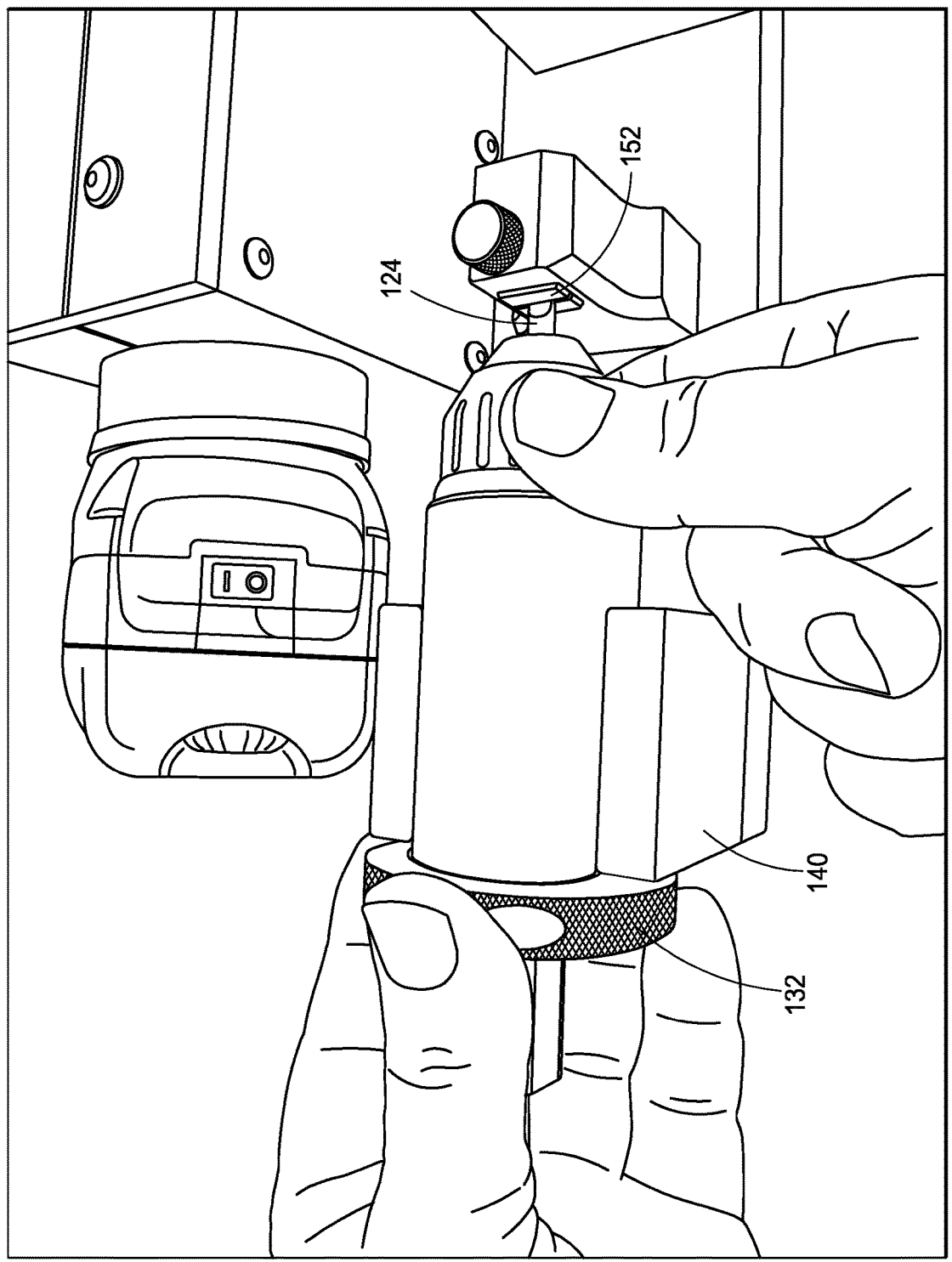
FIG. 10 is a depiction of a setup assembly engaging a driver support assembly according to an embodiment of the disclosure.

Referring next to FIG. 9, in a more detailed view, shaft tip 125 is shown engaging head guide 152 at recess 153. In accordance with example implementations, as can be seen, the head guide 152 can align tip 125 in substantially the same alignment as the alignment of recess 153. Referring next to FIG. 10, as can be seen with driver support assembly engaged to setup cradle 140, and shaft 124 engaged with head guide 152, collet 128 can be tightened to fix the relation between shaft 124 and the driver support assembly.

Figure 11:
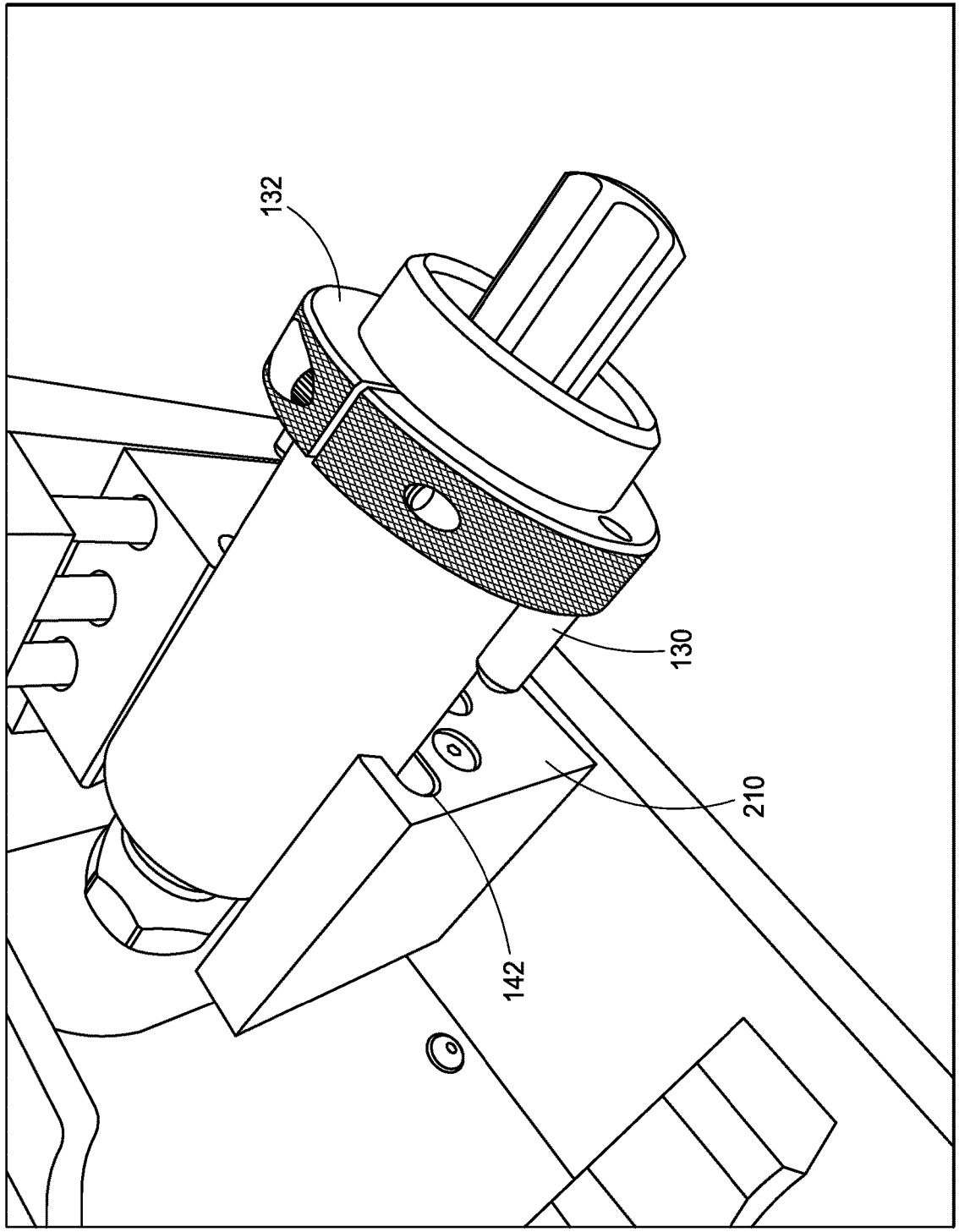
FIG. 11 is a depiction of a driver support assembly preparing to engage a cutting assembly according to an embodiment of the disclosure.
Figure 12:
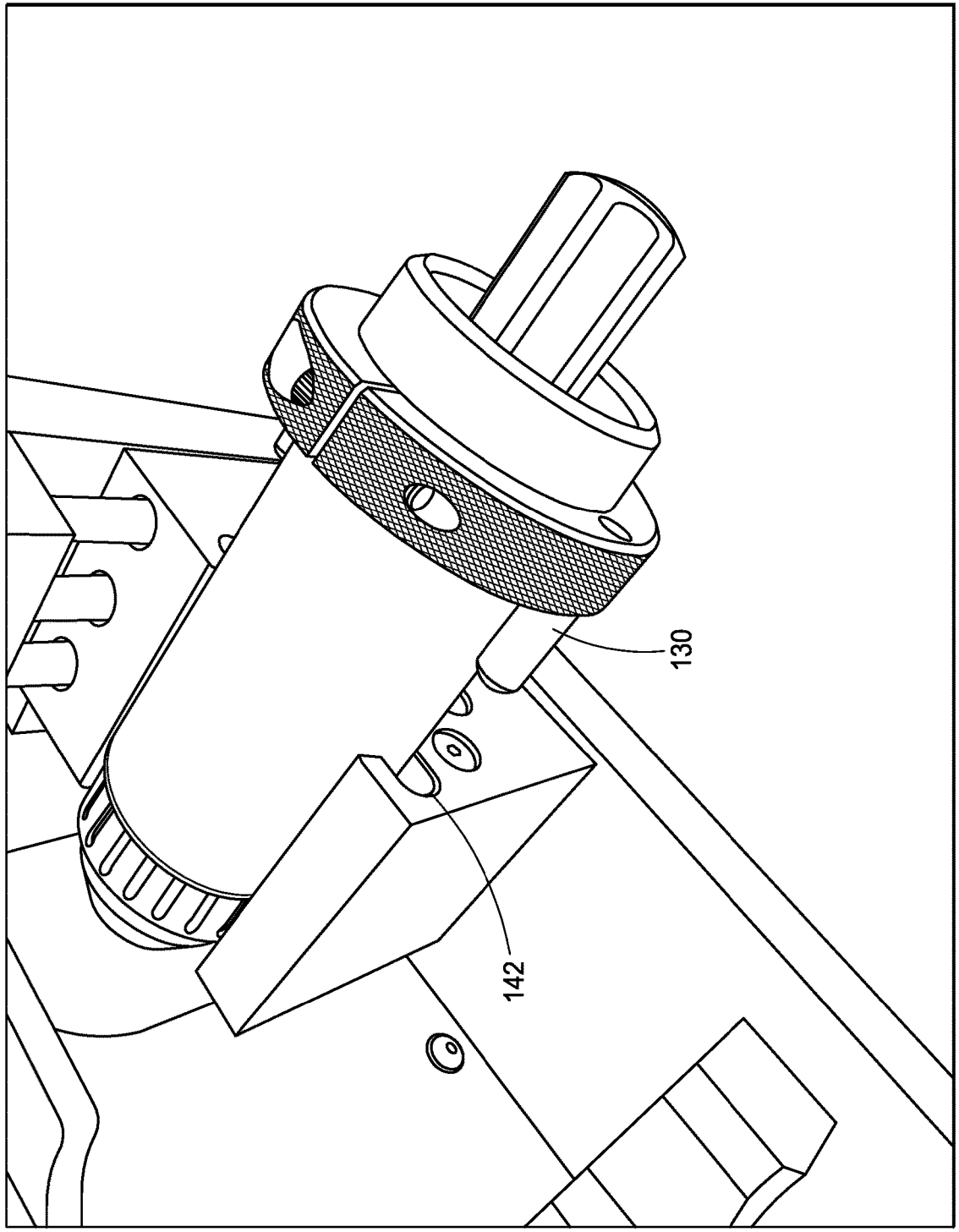
FIG. 12 is a depiction of a driver support assembly engaging a cutting assembly according to an embodiment of the disclosure.
Figure 13:
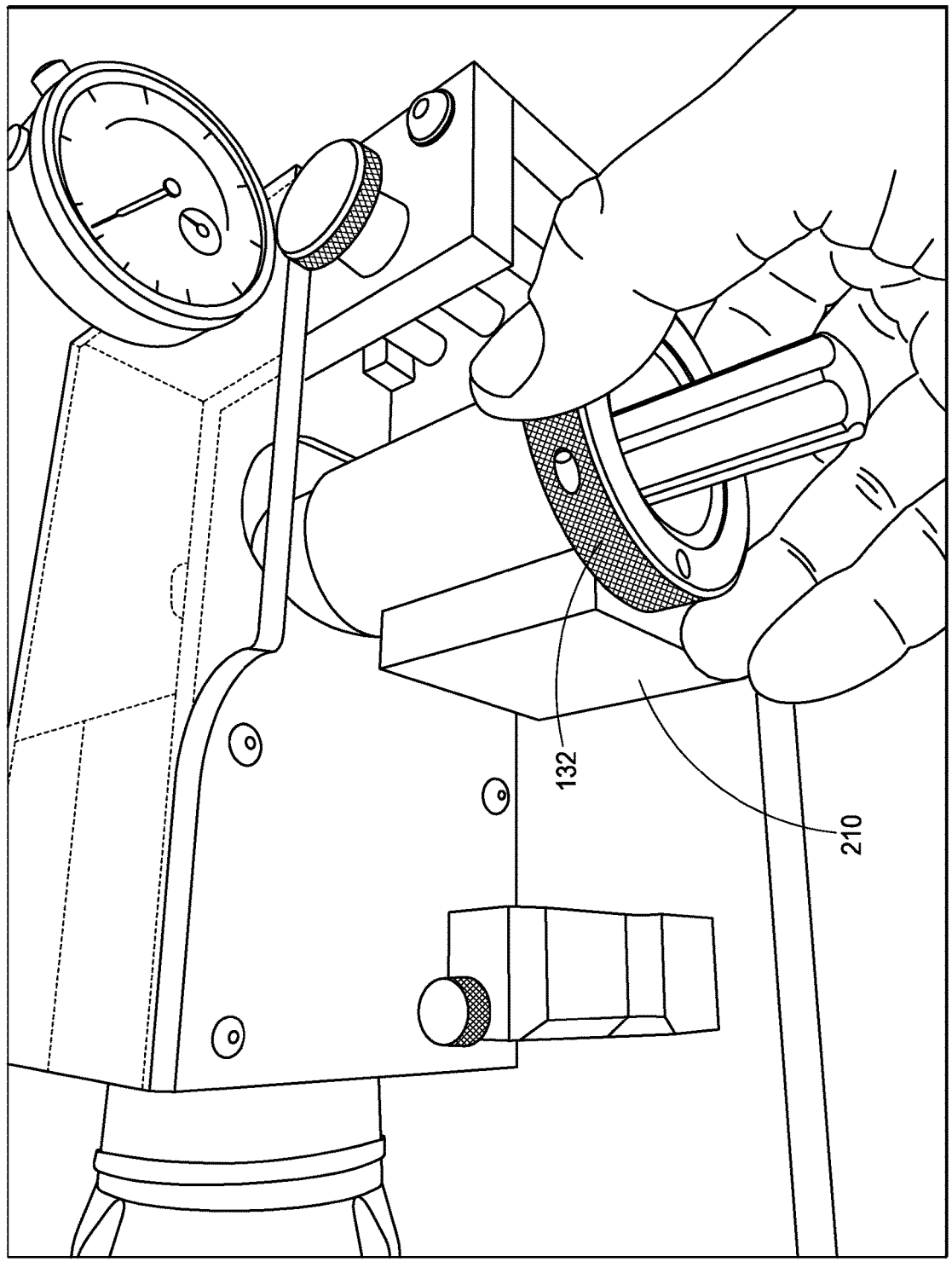
FIG. 13 is a depiction of a driver support assembly engaging a cutting assembly according to an embodiment of the disclosure.

Referring next to FIG. 11, a driver support assembly 120b can be engaged within cutting cradle 210 that includes channels 142 to receive fixed construct 130. Referring next to FIG. 12, driver support assembly 120a with fixed construct 130 is shown engaging channels 142, and referring to FIG. 13, fixed construct 132 is shown engaging cutting cradle 210 in a fully engaged position. In accordance with example implementations, while motor 230 operably engages a cutting head engaged normally to shaft, the driver support assembly can be slidably engaged within cutting cradle 210 and operated normally to the cutting head to grind the shaft tip to the desired depth. To define a desired depth of the cutting head, the micrometer can be utilized to engage a certain thinness or thickness as desired by raising or lowering cutting cradle 210.

Referring to FIG. 14, alternative tips rather than straight tips can be provided by rotating the driver support assembly within the cutting cradle to an alternative channel 142a, and then slidably engaging the driver support assembly within cutting cradle 210. Example alternative tips can include square or hexagonal, for example.

Referring next to FIG. 15, an exploded view of a cutting assembly 200 is shown that includes a depiction of motor 230 engaging motor mount 300 which forms part of the cutting chamber which includes the cutting head engaged with motor 230. In accordance with example implementations, this cutting chamber can include a cutting chamber wall 310 having an opening therein to receive a collet 128 of a driver assembly that includes body 122a, for example, with additional fixed construct 132a. As can be shown, this cutting cradle can include additional channels 142 as well as 142a and 142b, for example. Additionally, fixed construct 130 is shown in exploded view in relation to additional fixed construct 132. As can be seen, the cutting chamber can have a cutting chamber top 320. This cutting chamber top can be plastic glass, for example, or transparent, allowing the operator to view the engagement of the cutting head to a shaft tip, for example. As shown, base 160 engages the cutting chamber, the cutting cradle, and the setup cradle and assembly. Referring to FIG. 16, a top view shows cutting head 112 through translucent cutting chamber top 320.

Referring to FIG. 17, tip 125 is shown proximately engaging cutting head 112 and then referring to FIG. 18, tip 125 is shown engaging cutting head 112. As can be seen, the cutting head performs and provides a curved bevel from shaft into the tip of shaft 124.

Referring to FIG. 19, two driver setup assemblies are shown as 120a and 120b. Accordingly, both driver setup assemblies have fixed constructs 130a and 130b respectively, as well as additionally fixed constructs 132a and 132b, respectively.

Referring to FIG. 20, driver support assembly 120 is shown that includes collet receiving flange 440 configured to couple nut 450 housing collet 460 therein. Referring to FIGS. 21-23, an example driver support assembly can include body 120b that has walls 500 and interior flanges 510 that include threads 520. According to example configurations, a 3-jaw keyless chuck can engage threads 520 of body 120b.

Referring to FIGS. 24-27, an alternative chuck assembly can include a collet receiving flange can include a collet receiving flange 440 that includes interior threaded flange 530. Threaded flange 530 can be configured to engage body of driver support assembly 120b.

Referring next to FIGS. 28-30, additional construct 132 is shown as substantially ring form having openings 600 and a split 605 therein. In accordance with operational engagement, construct 132 can be placed about body 120 and fixedly attached by tightening a bolt that cross sections from across split 605 and tightening construct 132 about body 120. In accordance with example implementations, opening 600 within construct 132 can be configured to receive constructs 130, for example. Additional construct 132 can have a larger opening 620 configured to receive a bolt to a threaded opening 610, for example.

Referring next to FIGS. 31 and 32, construct 130 is shown that has a beveled portion 700 as well as a thinner recessed portion 710. Recessed portion 710 is configured to be engaged with opening 600, for example. Referring to FIGS. 33-35, setup cradle 140 is shown that includes channels 142 as well as walls 740 at the end of channels 142. In this embodiment, channels 142 do not extend the entire distance of setup cradle 140. Accordingly, the walls 740 can act as an abutment in the same sense that additional construct 32 may act as an abutment, fixing the depth relation of the driver support assembly within the setup cradle, for example.

Referring to FIGS. 36 and 37, cutting cradle 210 is shown that includes channels 142, 142a, and 142b. In accordance with example configurations, these channels also include depth walls 740 that are equally aligned and fix the depth relation of the driver support assembly within the cutting cradle.

Referring to FIGS. 38-40, alternative views of the cutting cradle are shown that include lift or guide opening 760 as well as a lift opening 770. Guide opening 760 can reside along shafts to maintain the angular alignment with a cutting head, while lift opening 770 can be engaged to provide lift with the micrometer of the cutting assembly.

Referring next to FIGS. 41-43, tip guide assembly 150 is shown that includes set screw opening 810 as well as tip guide opening 800. In accordance with example implementations, a set screw can be engaged via set screw opening 810 and engage tip guide with tip guide opening 800 to fix the tip guide block 820 in place.

Referring next to FIGS. 44-47, tip guide block 820 which can be engaged into tip guide opening 800 is shown that includes alternative recesses 830 and 840, which can be engaged by disengaging the tip block and reversing the orientation of same. In accordance with example implementations, tip guide recess 830 can be substantially larger than tip guide recess 840, as shown in detailed FIGS. 46 and 47, respectively.

Referring next to FIGS. 48-49, depictions of a micrometer column receiving nut 850 are shown. Nut 850 is received within recess 851 to receive micrometer control shaft 853.

Referring next to FIGS. 50-52, motor mount 300 is shown that includes tightening bolts 910 to tighten space 900 about receiving a motor mount therein. Referring to FIG. 53, chamber wall 310 is shown that includes opening 940 to receive collets of driver support assemblies. Referring to FIGS. 54-56, cutting cradle lift cap 960 is shown with various openings to receive the micrometer shaft as well as guide shafts therethrough.

Referring to FIGS. 57-58, in accordance with an alternative embodiment, cutting cradle assembly 210 is shown supported by support 1060 in a vertical configuration with the ability to adjust cutting cradle 210 in relation to a cutting head 1000. In accordance with example implementations, setup assembly 138 can be associated with cutting assembly 210 and the setup assembly is shown in FIG. 58 that includes a base 1062 as well as setup cradle 140.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for cutting a tip of a driver shaft, the method comprising:
   extending a mechanical driver shaft and a least a portion of a driver handle through a hollow chamber of a body of a driver support assembly to operatively affix the mechanical driver shaft within the driver support assembly to affix the alignment of a tip of the mechanical driver shaft in relation to constructs of the driver support assembly; and
   engaging the constructs of the driver support assembly with channels within a cutting cradle of a cutting assembly to remove specific portions of the mechanical driver shaft and create or refurbish the tip of the mechanical driver shaft.

2. The method of claim 1 wherein the engaging the constructs of the driver support assembly with channels within the cutting cradle is a sliding engagement.

3. The method of claim 1 wherein the channels oppose one another.

4. The method of claim 1 wherein the constructs of the driver support assembly may engage additional channels to produce alternative driver tips.

5. The method of claim 1 further comprising operatively engaging the body of the driver support assembly to secure the mechanical driver shaft in relation to the body of the driver support assembly.

6. The method of claim 5 further comprising engaging a collet assembly to secure the mechanical driver shaft in relation to the body.

7. The method of claim 1 wherein the affixing the alignment of the tip of the mechanical driver shaft in relation to constructs of the driver support assembly comprises operatively aligning a body of a setup assembly within a setup cradle.

8. The method of claim 7 wherein the operatively aligning the body of the setup assembly within the setup cradle comprises engaging complimentary portions of the setup cradle and the driver support assembly.

9. The method of claim 1 wherein the engaging the constructs of the driver support assembly with the cutting cradle of the cutting assembly to remove specific portions of the mechanical driver shaft and create or refurbish the tip of the mechanical driver shaft comprises slidably engaging the body of the driver support assembly with the cutting cradle to engage complimentary driver support assembly and cutting cradle structures.

10. The method of claim 9 wherein the complimentary structures are an opening defined by the cutting cradle and a construct of the driver support assembly.

11. The method of claim 1 further comprising providing both a setup assembly and the cutting assembly upon the same platform.

12. The method of claim 1 wherein the mechanical driver shaft is a screw driver shaft.

\* \* \* \* \*